United States Patent [19]
Kramer

[11] Patent Number: 5,998,780
[45] Date of Patent: Dec. 7, 1999

[54] INTEGRATED SEMICONDUCTOR MOTION SENSOR

[75] Inventor: Jörg Kramer, Zurich, Switzerland

[73] Assignee: California Institute of Technology, Pasadena, Calif.

[21] Appl. No.: 09/031,135

[22] Filed: Feb. 26, 1998

Related U.S. Application Data

[60] Provisional application No. 60/043,751, Apr. 11, 1997.

[51] Int. Cl.[6] .................................................. G01V 9/04

[52] U.S. Cl. ............................................ 250/221; 340/555

[58] Field of Search ................................ 250/221, 222.1, 250/559.32, 559.38, 559.44; 340/555–557, 567, 521–524, 541

[56] References Cited

U.S. PATENT DOCUMENTS 4,943,800  7/1990  Ikeda et al. ............................ 340/567

*Primary Examiner*—Que T. Le
*Attorney, Agent, or Firm*—Fish & Richardson P.C.

[57] ABSTRACT

An algorithm and circuits for sensing a moving optical stimulus. Three sequentially produced electrical signals at different locations in response to a moving stimulus are used to generate a monotonic function of velocity which is substantially insensitive to the global illumination level and stimulus contrast. Temporal aliasing is minimized by using an adaptive inhibition scheme. Dense arrays of such motion sensors can be monolithically integrated for the acquisition of entire velocity maps which can be used to obtain imaging information suitable for navigation of mobile systems in complex environments.

54 Claims, 23 Drawing Sheets

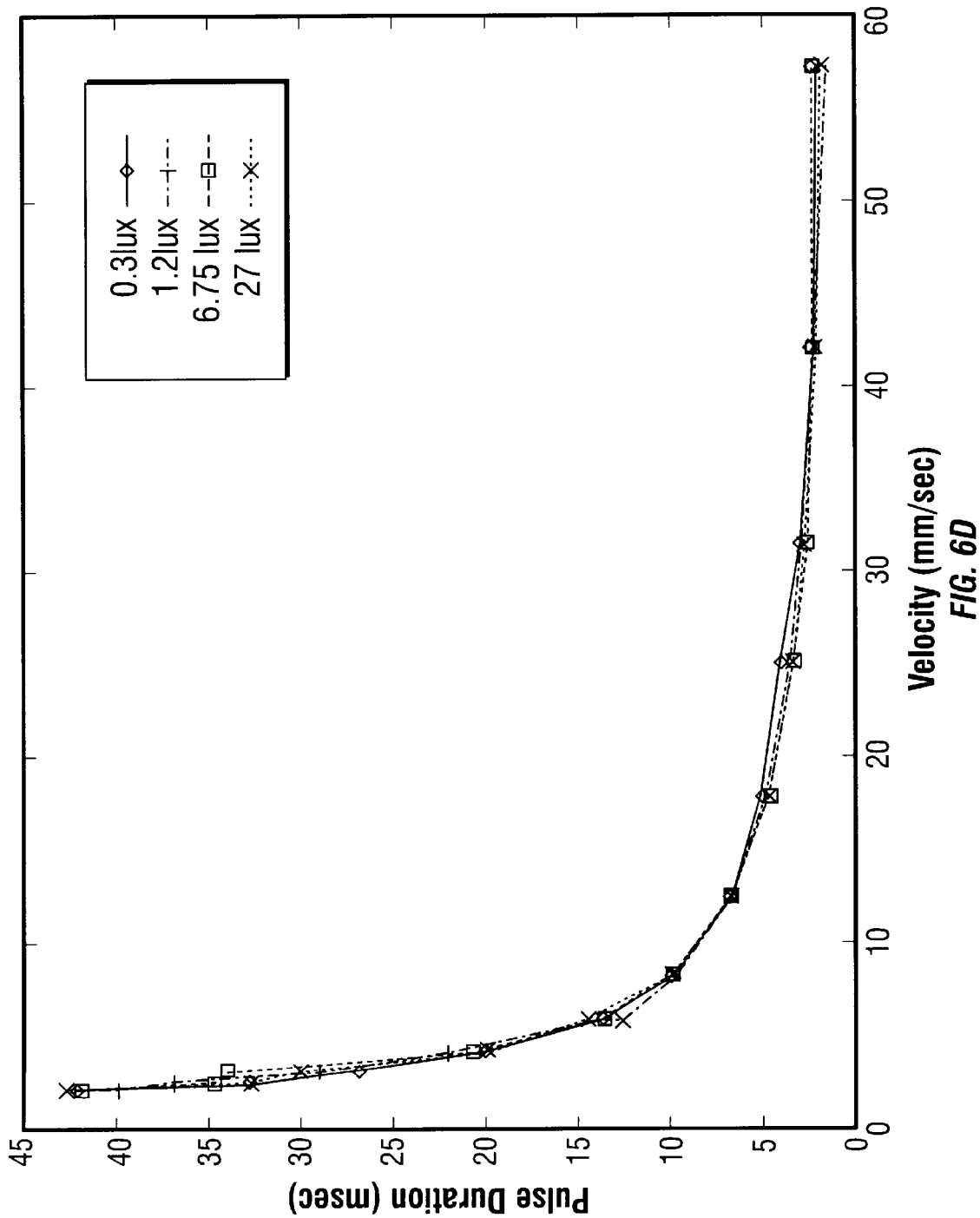

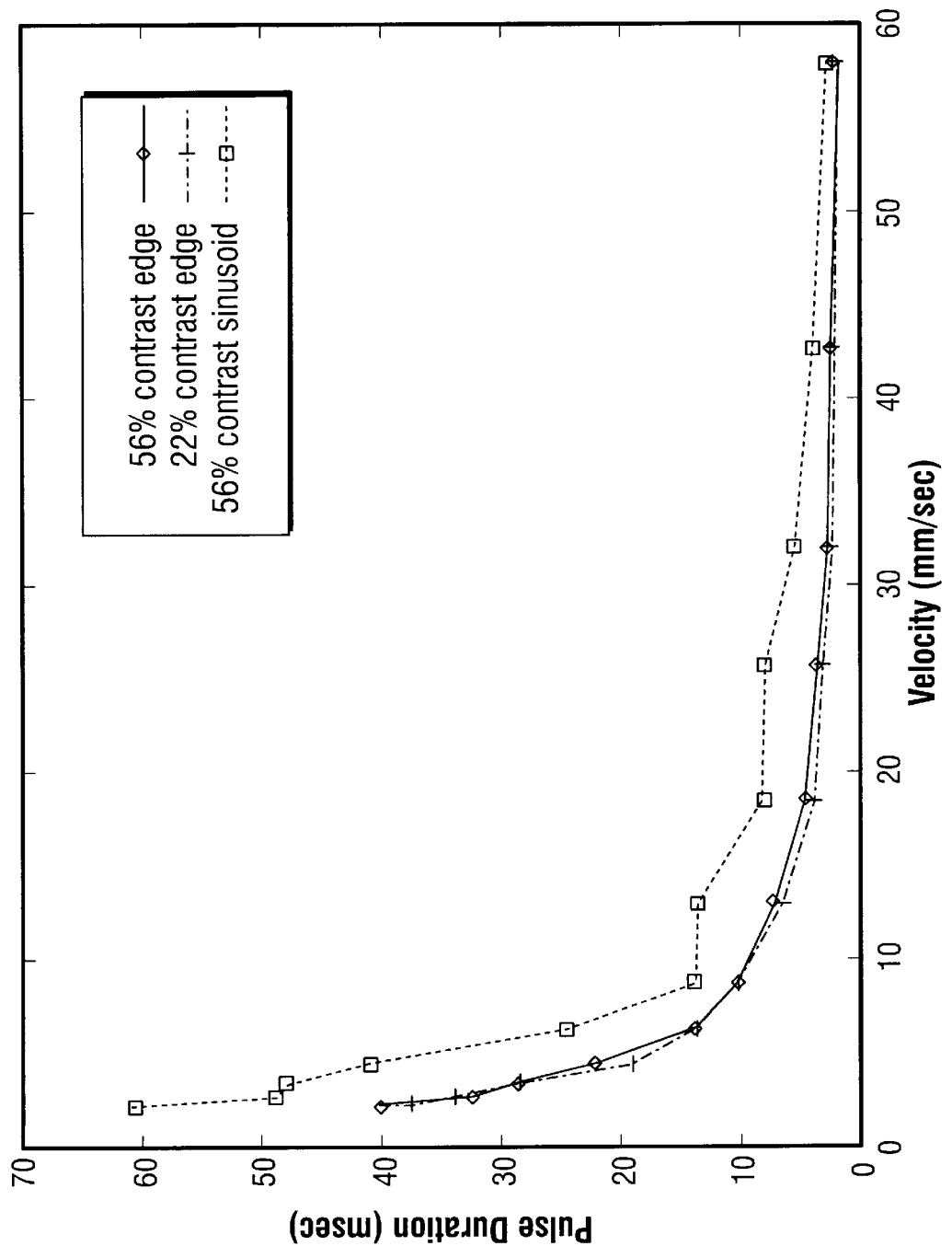

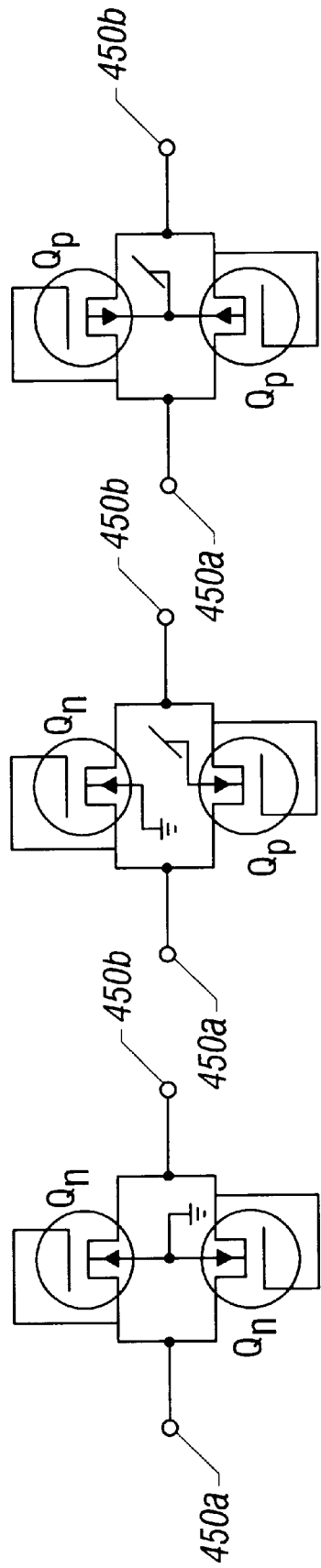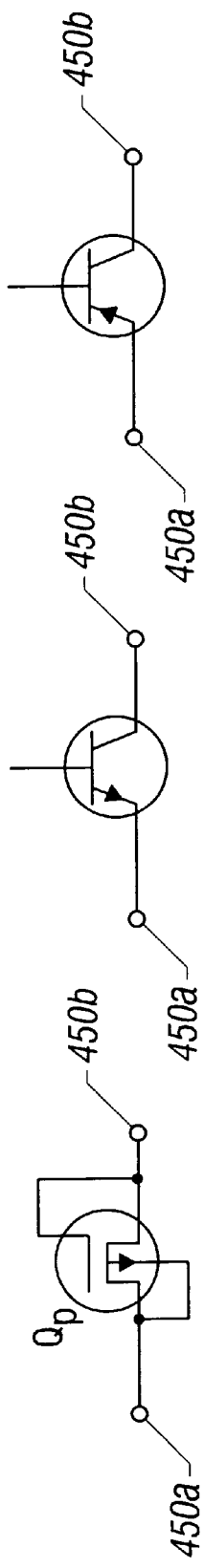
FIG. 7A  FIG. 7B  FIG. 7C
FIG. 7D  FIG. 7E  FIG. 7F

1001b

1001c

INTEGRATED SEMICONDUCTOR MOTION SENSOR

CROSS-REFERENCE TO RELATED APPLICATION

This application claims the benefit of U.S. Provisional Application Ser. No. 60/043,751, filed on Apr. 11, 1997, which is incorporated herein by reference.

ORIGIN OF THE INVENTION

The United States Government has certain rights in this invention pursuant to Grant No. N00014-91-I-1452 awarded by Office of Naval Research.

FIELD OF THE INVENTION

The invention relates to imaging and motion sensing devices, and more specifically, to a motion-sensing algorithm and an integrated electronic motion and image sensor with on-chip photosensors.

BACKGROUND OF THE INVENTION

Biological visual systems are complex and sophisticated information-processing systems that obtain raw sensory data from the external environment and extract meaningful information. Emulation of the functions and capabilities of various biological visual systems in electronic sensing and control devices is of great scientific interest and commercial importance. Integrated electronic sensors that emulate or are inspired by biological visual functions are sometimes referred to as "neuromorphic vision chips". These sensors can have applications in a number of fields such as machine vision, automotive guidance, robotics, and remote sensing. In a typical neuromorphic vision chip, a visual stimulus is received and is converted into an electrical signal in a desired format by using one or more photosensors. This electrical signal is then further processed on the same chip. Neuromorphic vision chips thus may be classified as a special type of "smart vision chips" which in general include all integrated circuits performing certain on-chip signal processing of visual data.

In a system interacting with a dynamic environment, a smart vision chip may often be required to respond in "real time", i.e., a short duration in which the scene does not evolve significantly. For example, such a system may need to rely on the extracted information from the received visual data to guide the system behavior. "Real time" for a neuromorphic vision chip usually means the response time of the corresponding biological system that the chip emulates. In many applications in which the typical human visual system is partially emulated, the response time of a neuromorphic vision chip is usually on the order of few tens of milliseconds in order to be considered as "real time".

Typical neuromorphic vision sensor architectures for high response speeds generally implement compact VLSI designs and integrate image-sensing circuitry with the visual computation circuits on a single chip. The visual computation circuits can be arranged in a way so that local processing elements are distributed throughout the chip close to their respective inputs. Such circuit arrangement can be adapted for implementation of fully parallel processing using a small amount of wiring. Parallel architectures can at least partially reduce the requirement of high bandwidth in high speed processing.

One class of smart-vision chips, including neuromorphic vision chips, extracts motion in a visual field. Motion information is an important component of visual information and can be critical to many applications that require tracking moving objects or determining the physical extent of moving objects. In addition, a variety of image-processing tasks, such as segmentation and estimation of depth, may be considerably simplified in dynamic scenes if motion data is available. Motion algorithm and chip architecture are two main factors that affect the performance of a motion sensor.

Analog processing in motion sensors can be used advantageously over digital processing. For example, an analog motion sensor can be made more compact than a digital motion sensor with comparable processing power due to the higher information content of an analog signal. Also, analog circuits can be configured to consume less power than their digital counterparts. See, for example, Mead, "Neuromorphic electronic systems", Proc. IEEE, Vol. 78, pp. 1629–1636 (1990). Small size and low power consumption are desirable for motion-sensing arrays to achieve high densities of motion-processing elements and thus high imaging resolution.

In many applications, analog processing is considered inferior to digital processing because its limited precision. In visual motion sensing, however, digital approaches lose their usual advantage in precision due to inherent high noise in the optical signals and fundamental computational limitations associated with the estimation of the velocity field from the optical flow of a visual scene. See, for example, Verri and Poggio, "Motion field and optical flow: Qualitative properties," IEEE Trans. Pattern Analysis and Machine Intelligence, Vol. 11(5), pp. 490–498 (1989). The resulting errors and uncertainties may not be reduced by improving the precision of individual processing elements. However, certain priori information, e.g., information on the piecewise rigidity of the environment, can be used to obtain some redundancy. Such redundancy may be used for error correction and noise reduction.

Algorithms for the computation of visual motion may be classified into different categories according to biological evidence or computational implications. Given a host of fundamental difficulties in reliably estimating a velocity field from purely visual data (i.e., optical flow) and the various trade-offs to be considered when designing a sensing circuit, the choice of the algorithm should be made based on the specifications of the system and the operation environment. One classification relevant to the present disclosure distinguishes gradient and correspondence algorithms.

Gradient schemes extract the velocity of an image feature from approximations of temporal and spatial derivatives of the local brightness distribution. Since the calculation of derivatives is sensitive to circuit offsets, noise, and illumination levels, gradient algorithms can be difficult to implement robustly with analog circuitry. An example of gradient implementation is a two-dimensional analog motion sensor by Tanner and Mead. See, Tanner and Mead, "An integrated analog optical motion sensor", VLSI signal Processing, II, S. Y. Kung, ed., pp. 59–76, New York, IEEE press (1986).

Another category, correspondence methods, estimates motion by comparing the positioning of a pattern at different times (i.e., "spatial correspondence"), or by comparing the timing of a pattern at different positions (i.e., "temporal correspondence"). While digital implementations of correspondence algorithms typically use the spatial correspondence, most analog implementations and well-understood biological systems do not intrinsically need to discretize time and thus use the temporal correspondence.

Correspondence methods can be further divided into correlation methods and token-based methods. Correlation methods operate on any type of image structure and hence, like gradient methods, produce a dense map of velocity estimates. However, correlation methods usually exhibit better numerical stability than gradient methods, since correlation is based on multiplication and integration, rather than on differentiation. Token-based methods only respond to a particular class of image features, by first making a decision about their presence at a given location in space and time. At the expense of producing only sparse velocity maps, token-based methods can be made to operate quite robustly.

Many attempts have been made to implement temporal-correspondence algorithms in VLSI circuits, ranging from pure correlation schemes to algorithms performing correlation-type motion computation on extracted image tokens and to token-based time-of-travel methods. Most of these previous analog VLSI motion sensors either only responded robustly to stimuli of very high contrasts or had an output signal that did not encode pure velocity but strongly depended on contrast and/or illumination.

On the other hand, token-based time-of-travel correspondence algorithms have been implemented with compact circuits to unambiguously encode one-dimensional velocity over considerable velocity, contrast, and illumination ranges. A temporal-edge detector responsive to dark-bright edges was used as a feature extractor in the input stage.

Kramer et al. developed a facilitate-and-sample ("FS") circuit which uses an edge signal to produce a sharp voltage spike and a logarithmically-decaying voltage signal at each detector location. See, Kramer et al., "An analog VLSI velocity sensor," Proc. 1995 IEEE Inte'l Symp. Circuits and Systems, pp. 413–416, Seattle, May 1995. The voltage spike from one location was used to sample the analog voltage of the slowly-decaying signal of an adjacent location, which was a measure of the relative time delay of the triggering of the two signals and thus of the edge velocity.

Sarpeshkar et al. implemented a facilitate-and-trigger circuit ("FT") in which an edge signal is used to generate a voltage pulse of fixed amplitude and duration at each edge-detector location. See, Sarpeshkar et al., "Visual motion computation in analog VLSI using pulses," in Advances in Neural Information Processing Systems 5, pp. 781–788, San Mateo, Calif., Morgan Kaufman (1993). The pulses from two adjacent locations were fed into two motion circuits, one for each direction. For motion in a preferred direction such a motion circuit outputs a pulse with a duration equal to the overlap time of the input pulses, while for motion in a null direction opposite to the preferred direction, no output pulse was generated.

The above circuits were demonstrated to be able to measure the velocities of sharp edges of a medium to high contrasts. In particular, the output signal was essentially independent of contrast and the global illumination level over a considerable range. For lower contrasts and more gradual edges, the response started to decrease, thus underestimating the speed. See, Kramer et al., "Pulse-based analog VLSI velocity sensors,", IEEE Trans. Circuits & Systems II: Analog and Digital Signal Processing, Vol. 44(2), pp. 86–101 (1997).

Many of the motion sensors known in the art are subject to a temporal-aliasing criterion and a spatial-aliasing criterion. Since fixed time and space parameters are used for motion computations in these sensors, the speed detection ranges in the temporal and spatial domains may be limited.

SUMMARY OF THE INVENTION

The present disclosure presents a compact motion circuit using a token-based time-of-travel correspondence algorithm that encodes velocity in one dimension in the duration of binary output pulses. The pulse duration is inversely related to velocity. A three-element-interaction scheme associates one motion sensor with at least three separated photosensors to implement direction selectivity using active facilitation and inhibition with time constants adapting to the speed of the stimulus. This prevents temporal aliasing over a large velocity range.

For a stimulus moving in a preferred direction of the motion sensor, a facilitation signal is dynamically generated to inform the motion sensor to "anticipate" the incoming stimulus and sets the motion sensor in a "ready" state for receiving and processing signals. Subsequently, a triggering signal generated upon arrival of the anticipated stimulus activates the motion sensor to generate an appropriate signal. Finally, an inhibition signal is generated to indicate that the pass-by stimulus has left and thereby the motion sensor terminates the generation of the signal. At this point, the motion sensor completes one operation cycle and is set to an inactive state, ready for receiving another initiating facilitation signal of another cycle. When the stimulus moves opposite to the preferred direction of the motion sensor, the inhibition signal is generated before the triggering signal and prevents the motion sensor from producing an output signal. This algorithm will be referred to as the facilitation-triggering-inhibition (FTI) algorithm throughout this disclosure.

An FTI motion sensor may be configured to receive inputs from three adjacent temporal edge detectors to sense one-dimensional motion in a predetermined direction. Two or more FTI motion sensors may be used cooperatively to sense any motion in one, two or more dimensional space. Each temporal edge detector is configured so that the response characteristics of the FTI motion sensor are substantially invariant against global illumination level and edge shape.

These and other aspects and advantages of the present invention will become more apparent in light of the following detailed description, as illustrated in the accompanying drawings, and the appended claims.

BRIEF DESCRIPTION OF THE DRAWINGS

FIG. 6D is a chart showing output-pulse duration of a motion-sensing element for the preferred direction of motion of a 56%-contrast ON edge versus image velocity for different levels of incandescent AC room illumination.

FIG. 6E is a chart showing output-pulse duration of a motion sensing element for the preferred direction of motion of different ON edges for incandescent AC room illumination.

FIGS. 7A, 7B, 7C, 7D, 7E, and 7F show exemplary adaptive elements in accordance with the invention.

DETAILED DESCRIPTION OF THE INVENTION

Figure 1:
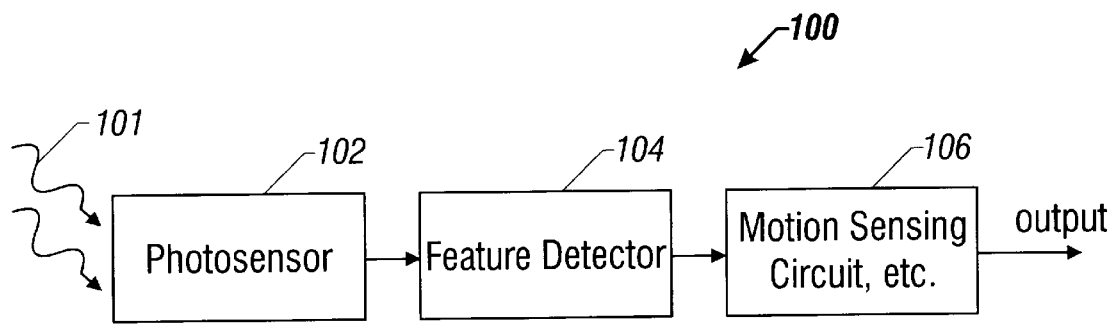
FIG. 1 is a block diagram showing the functional units for a motion-sensing element in a motion sensing array in accordance with one embodiment of the invention.

Motion sensors generally compute parameters of moving objects based on discrete approximations of space or time. Such discrete approximations give rise to aliasing effects such that an output signal of the motion sensors has an irregular or erratic dependence on the input parameters. Aliasing may occur whenever the spatial or temporal structure of an input signal has a similar or higher density than the resolution of the sensing array. Aliasing effects may lead to an inaccurate estimate of the velocity or even completely spurious data. Hence, it is desirable to substantially reduce or minimize such aliasing effects.

Most implementations of motion sensing and imaging measure irradiance at discrete locations with a regular spacing $\Delta x$. This gives rise to the following criterion for the prevention of spatial aliasing that sets an upper limit to the spatial frequency k in the image:

$$k < \frac{1}{2\Delta x}. \tag{1}$$

Analog "time-of-travel" correspondence algorithms usually operate based on continuous time and therefore are not fundamentally limited any further by temporal aliasing. Many time-of-travel correspondence algorithms are token-based methods that infer the velocity $\upsilon$ of an image token from its time of travel $\Delta t$ between two adjacent locations separated by the spacing $\Delta x$:

$$\Delta t = \frac{\Delta x}{\upsilon}. \tag{2}$$

Since the temporal frequency $\nu$ at a fixed location in the image is given by $$\nu = k \cdot \upsilon, \tag{3}$$

any stimulus that is not spatially aliased automatically satisfies the following condition $$\nu < \frac{1}{2\Delta t}, \tag{4}$$

i.e., such a stimulus is also not temporally aliased.

According to the present invention, conditions (1) and (4) may be satisfied by eliminating high-frequency components in space and time domains from the input signal. This can be achieved by respectively performing spatial low-pass filtering and temporal low-pass filtering. Spatial low-pass filtering may be done by optical means. Temporal low-pass filtering usually requires additional circuitry in conventional motion-sensing circuits. However, a time-of-travel correspondence algorithm can be implemented to automatically eliminate the temporal aliasing by eliminating the spatial aliasing. Therefore, the aliasing problem can be conveniently solved by using a time-of-travel correspondence algorithm and spatial low-pass filtering.

The present invention is in part based on a temporal correspondence algorithm. The timing of a stimulus detected at different spatial positions on a sensor array is used to generate pulses with pulse durations inversely proportional to the speed of the stimulus. In particular, the pulse durations are adaptively adjusted according to the speed of the stimulus. This prevents temporal aliasing over a large velocity range including very high velocities.

A special facilitation-triggering-inhibition ("FTI") mechanism is implemented in the temporal-correspondence algorithm. For a stimulus moving in a preferred direction of a motion sensor, a facilitation signal is dynamically generated to inform the motion sensor to "anticipate" the incoming stimulus and sets the motion sensor in a "ready" state for receiving and processing signals. Subsequently, a triggering signal generated upon arrival of the anticipated stimulus activates the motion sensor to generate an appropriate signal. Finally, an inhibition signal is generated to indicate that the pass-by stimulus has left and thereby the motion sensor terminates the generation of the signal. At this point, the motion sensor completes one operation cycle and is set to an inactive state, ready for receiving another initiating facilitation signal of another cycle.

If, on the other hand, the stimulus moves in a direction opposite to the preferred direction of the motion sensor, the inhibition signal is generated before the triggering signal, preventing the motion sensor from generating an output signal.

An integrated circuit that implements the FTI temporal-correspondence algorithm may include a multiplicity of motion-sensing units to form a "smart-vision" array. FIG. 1 shows functional blocks in a signal chain of one unit 100 in such a motion-sensing array. Each unit may include a photosensor 102, a feature detector 104, and a motion sensor 106. A stimulus 101 from a target object is sensed by the photosensor 102. The feature detector 102 converts the signal from the photosensor 100 into a pulsed signal which is processed by a motion sensing circuit 106 to produce an output electrical signal indicative of the position, speed, or relative moving direction of the stimulus with respect to the array.

A suitable feature detector 104 may be any circuit that responds to a certain image feature with a short current or voltage spike. Detectors for low-level features, such as edges, can provide denser feature maps and are simpler to build with analog integrated circuits than those designed for detecting higher-level image features. Hence, many token-based motion algorithms use edges as image tokens.

One implementation of the feature detector 104 may include an edge detector to convert a dark-bright stimulus ("ON edge") and/or bright-dark stimulus ("OFF edge") into an electrical pulse. This type of feature detectors is called a temporal-edge detector which responds to irradiance transients at a single position. Temporal-edge detectors are generally more compact and less prone to circuit offsets than spatial-edge detectors. Temporal-edge detectors are configured to respond to irradiance differences between nearby locations. See, Bair and Koch, "Analog VLSI chip for finding edges from zero-crossings" in Advances in Neural Information Processing Systems 3, Lippman et al. Eds., pp. 399–405, Morgan Kaufman (1991). Temporal-edge detectors can thus be operated at lower contrast-detection thresholds under slowly-varying lighting conditions.

The motion sensing circuit 106 includes circuits to sense the direction of motion and/or speed of the detected stimulus by processing the electrical pulses from the feature detector 104. Additional circuits capable of performing other signal processing may also be included in the motion sensing circuit 106.

These and other functionally different circuits may not necessarily be physically separated from one another and may be integrated in a physically interposed configuration for manufacturing convenience or compactness. For example, a CMOS implementation of the sensor array may integrate the functional blocks 102, 104 and 106 as a single unit.

The operation of each motion sensor is controlled by the aforementioned facilitation signal, triggering signal and the inhibition signal. These control signals are generated at different times by feature detectors coupled to the photosensors at different locations. Thus, each motion sensor is electrically connected to at least three different photosensors that are located relative to one another in a spatial sequence along a designated direction. Each of these three photosensors respectively is coupled to at least one feature detector that respectively generates the facilitation signal, the triggering signal and the inhibition signal for sensing the motion of a stimulus along that designated direction. In particular, three spatially adjacent photosensors in a sensor array may be used to implement the facilitation-triggering-inhibition mechanism.

Figure 2:
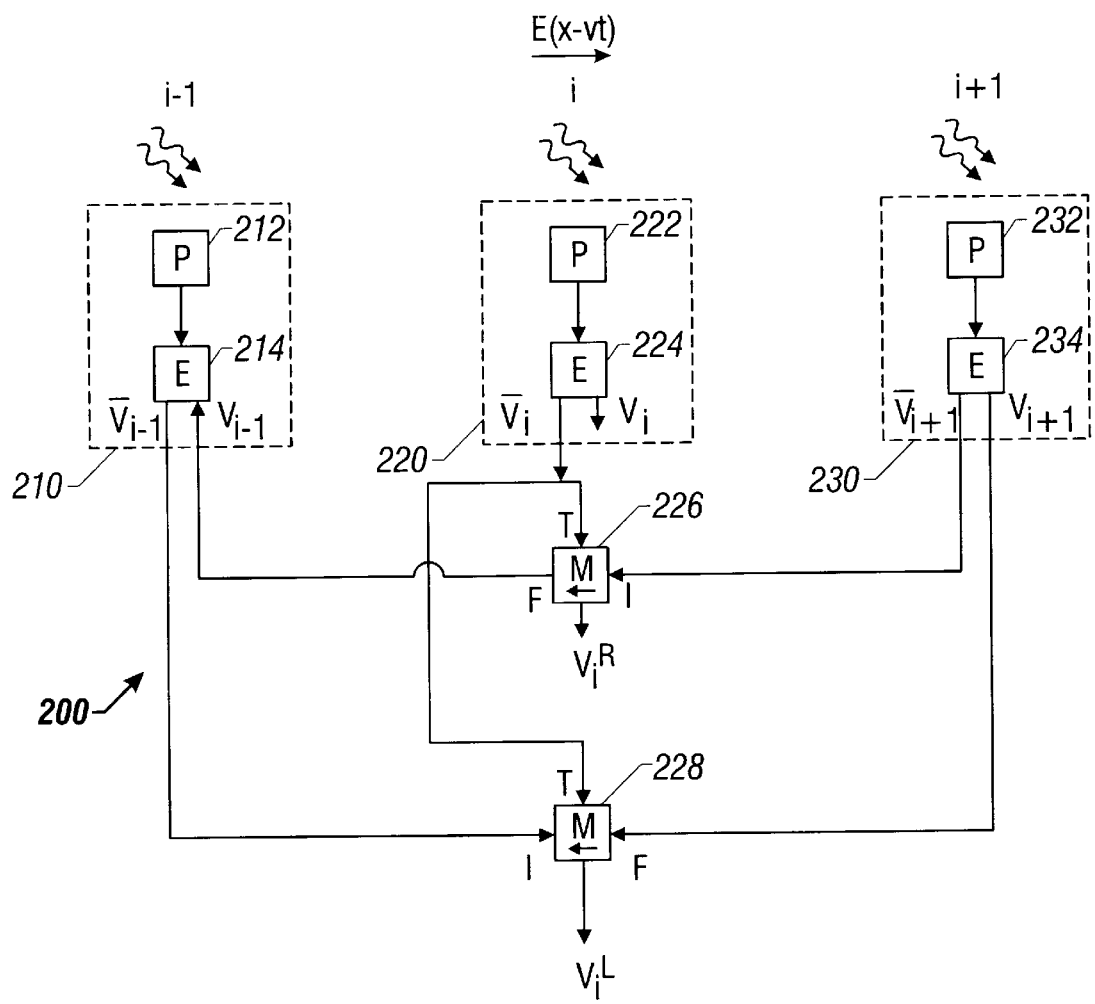
FIG. 2 is a block diagram showing a preferred architecture of a motion sensor that implements the facilitation-triggering-inhibition ("FTI") algorithm.

FIG. 2 shows one embodiment of a unit sensing block 200 in a smart-vision array. For simplicity of discussion, a one-dimensional array is illustrated. The sensing block 200 operates based on signals from three spatially displaced sensing elements 210, 220, and 230. Each element includes a photosensor "P" (e.g., 222 for the element 220) and an edge detector "E" (e.g., 224 for the element 220). Two FTI motion sensors "M" 226 and 228 are used for sensing motions in two opposite directions. For simplicity, only the motion sensors associated with the position i (i.e., the sensing element 220) are shown in FIG. 2.

In this embodiment, the feature detector includes a temporal-edge detector "E" which is designated to each motion-sensing unit. The motion sensing circuit includes a first FTI motion sensor 226 for sensing a "rightward"-moving stimulus relative to the array and a second FTI motion sensor 228 for sensing a "leftward"-moving stimulus. In particular, the motion sensing circuit needs input signals from at least three sensing elements spatially displaced along the direction of the motion as required by the FTI motion-sensing algorithm. This three-element interaction is one of the distinct features of the invention.

A stimulus that moves with respect to the sensing array is sequentially detected by the elements. The photosensor "P" in each element converts a received optical stimulus into an electrical signal and the respective edge detector "E" processes the signal to produce two output control signals V and $\overline{V}$. The electrical signals in general can be either current signals or voltage signals. The two motion sensors 226 and 228 associated with the element 220 receive one output signal from each of the two neighboring edge detectors 214 and 234 and one output signal from the edge detector 224. Each motion sensor is direction-selective and is configured to sense a stimulus that moves in a predetermined direction.

More specifically, in the embodiment 200 shown in FIG. 2, the motion sensor 226 is configured to generate an output signal $V_i^R$ indicative of a stimulus moving to the right and the motion sensor 228 is configured to generate a signal $V_i^L$ indicative of a stimulus moving to the left. For the motion sensor 226, the facilitation signal F is the output V of the edge detector 214 ($V_{i-1}$) on the left-hand side of the element 220, the triggering signal T is the output $\overline{V}$ from the edge detector 224 ($\overline{V}_i$), and the inhibition signal I is the output $\overline{V}$ from the edge detector 234 ($\overline{V}_{i+1}$) on the right-hand side of the element 220. The motion sensor 228 is preferably identical to the motion sensor 226 but has different input connections: the output V from the edge detector 234 ($V_{i+1}$) is the facilitation signal and the output $\overline{V}$ from the edge detector 214 ($\overline{V}_{i-1}$) is the inhibition signal while the same signal $\overline{V}_i$ from the edge detector 224 is used as the triggering signal.

For example, an edge-like stimulus moving from left to right first causes the edge detector 214 at position (i−1) to generate a voltage spike $V_{i-1}$. This signal facilitates the response of the motion sensor 226 for rightward motion. Next, the edge detector 224 detects the edge at position i and thereby produces a voltage spike $\overline{V}_i$. This voltage spike $\overline{V}_i$ triggers the motion sensor 226 to initiate a voltage pulse $V^R_i$ at the output thereof. When the edge stimulus arrives at the next position (i+1) to the right, the edge detector 234 produces an inhibition signal $\overline{V}_{i+1}$ which causes the motion sensor 226 to terminate the output voltage pulse $V^R_i$.

A rightward moving stimulus does not cause the motion sensor 228 for the left direction to react. The other output $\overline{V}_{i-1}$ from the edge detector 214 at the position (i−1) arrives at the motion sensor 228 first which inhibits the circuit. Thus, the subsequent triggering signal $\overline{V}_i$ cannot trigger the motion sensor 228. Conversely, for a leftward moving stimulus, the motion sensor 228 will be facilitated and an output signal $V^L_i$ will be generated while the motion sensor 226 will not respond.

It follows from the above description that the duration Δt of the output-voltage pulse $V^R_i$ from the motion sensor 226 is essentially determined by the time that a rightward-moving edge stimulus travels from the photosensor 222 to the next photosensor 232. More specifically, the output-pulse duration Δt is inversely proportional to the velocity υ of the stimulus as indicated in Equation (2). Similarly, the duration of the output-voltage pulse $V^L_i$ from the motion sensor 228 is determined by the time of travel of a leftward moving stimulus from the photosensor 222 to the photosensor 212.

Therefore, the time delay between triggering and inhibiting of either the motion sensor 226 or the motion sensor 228 and thereby the pulse duration Δt of the output voltage pulse $V^R_i$ or $V^L_i$ are intrinsically adaptable to the speed of the stimulus. Thus, stimuli with a wide range of speed can be detected. In the embodiment 200, facilitation in the preferred direction and inhibition in the null direction last twice as long as the output pulse and therefore are also intrinsically adaptable to stimulus speed. The temporal-aliasing criterion stated in Equation (4) is thus equivalent to the spatial-aliasing criterion of Equation (1). The lower limit of the speed range may approach substantially zero and in practice can be determined by the time that the respective motion sensor could hold the output voltage above a given threshold value. The upper limit of the speed range is essentially set by the response times of the circuits.

The above FTI algorithm and circuit are referred to as "neuromorphic" partially because of observations on certain biological systems that exhibit direction selectivity due to local inhibition. See, Barlow and Levick, "The mechanism of directionally selective units in the rabbit's retina," Journal of Physiology, Vol. 178, pp. 447–504 (1965).

Any light-responsive sensing device may be used to implement the photosensors 212, 222, and 232. For example, photodiodes, phototransistors and the like may be used alone or in conjunction with additional circuitry that modifies the response characteristics. A photosensor is essentially a circuit to generate either a current signal or a voltage signal that is indicative of the incoming light irradiance or any other parameters associated with electromagnetic radiation, such as spectral distribution and polarization.

Figure 3:
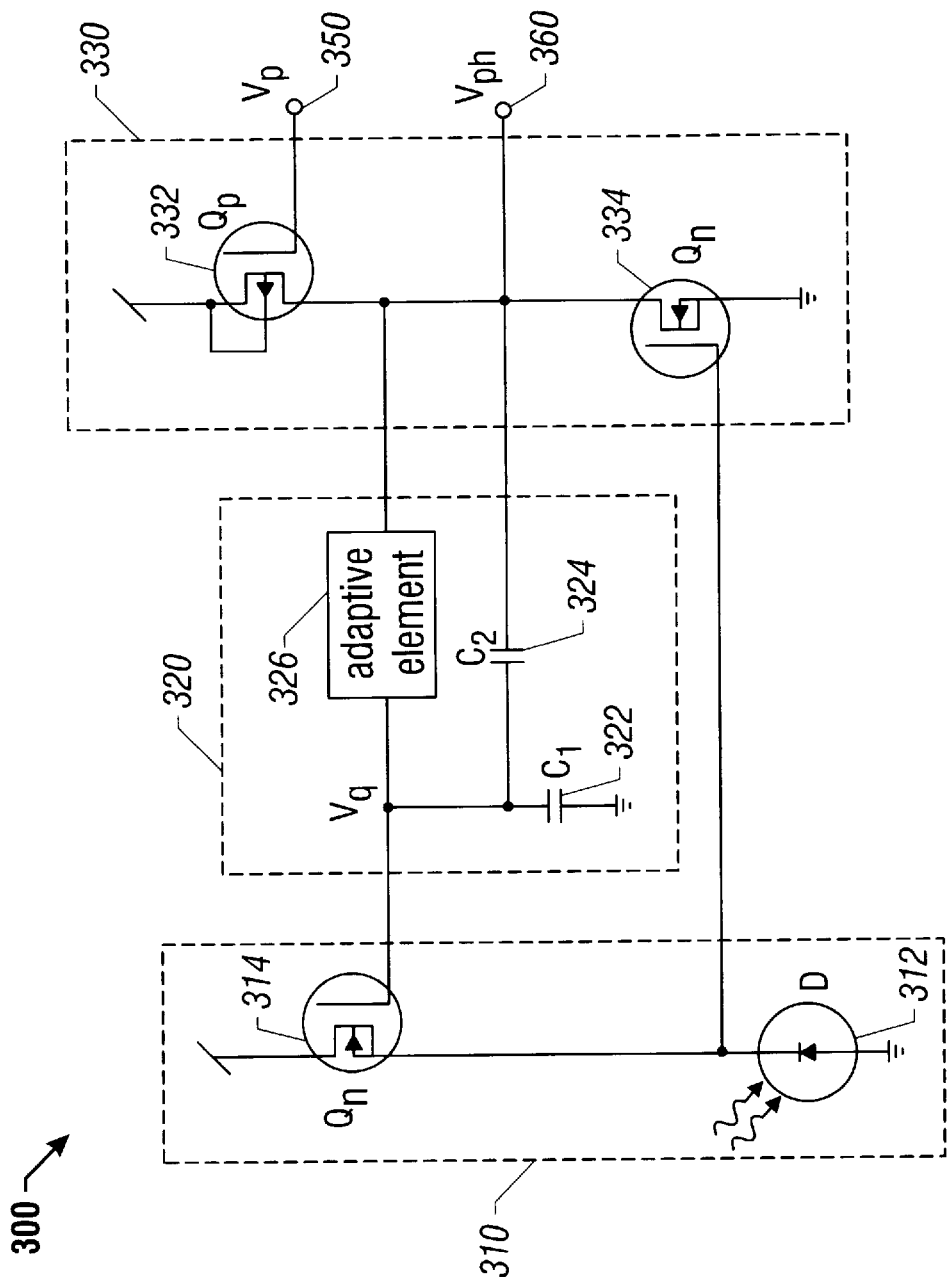
FIG. 3 is a diagram of one embodiment of a photosensor based on a photodiode.

One embodiment of a suitable photosensor may take a form shown in FIG. 3. The photosensor 300 includes three functional blocks: a light sensing cell 310, an amplifying stage 320, and a gain-feedback circuit 330. The light sensing cell 310 has a photodiode 312 and a transistor 314 (e.g., n-type MOSFET $Q_n$). An input light irradiance received by the photodiode 312 is converted into a voltage signal $V_q$ at the gate of the transistor 314. The amplifying stage 320 is a capacitive gain circuit having at least two capacitors 322 ($C_1$), 324 ($C_2$) and an optional adaptive element 326. The adaptive element 326 can be used to effect a voltage-dependent resistor. FIGS. 7A–7F show several different configurations for the adaptive element 326. In implementation, the terminals 450a and 450b may be exchanged. The amplifying stage 320 with the adaptive element 326 is configured to produce an output voltage $V_{ph}$ which is slowly adaptive to the steady-state response $V_q$. The feedback circuit 330 includes a p-type MOSFET 332 and an n-type MOSFET 334 connected in series. See, Delbruck, "Investigations of analog VLSI visual transduction and motion processing", Ph.D. dissertation, California Institute of Technology, Pasadena, Calif. (1993).

Assume a received light signal has an irradiance of E generated by a rapid positive transient corresponding to a dark-bright or "ON" edge. The steady-state voltage $V_q$ in the photosensor 300 has a logarithmic dependence on the irradiance E. Thus, the voltage transient $dV_q$ caused by a small irradiance transient dE is a function of the relative irradiance change, i.e., dE/E, and thus essentially independent of the total image brightness. The transient change $dV_{ph}$ in the output voltage $V_{ph}$ at terminal 360 has a gain of $(C_1+C_2)/C_2$ with respect to $dV_q$. This can be expressed by:

$$dV_{ph} = \left(\frac{C_1 + C_2}{C_2}\right)\left(\frac{kT}{q\kappa}\right)\left(\frac{dE}{E}\right), \quad (5)$$

where k is the P-Lanck constant, T is the absolute temperature, q is the electron charge, and K is the back-gate coefficient of the transistor 314. (kT/q) represents the thermal voltage. Therefore, the transient signal change $dV_{ph}$ in the output voltage $V_{ph}$ at terminal 360 is proportional to the relative irradiance change dE/E.

Figure 4:
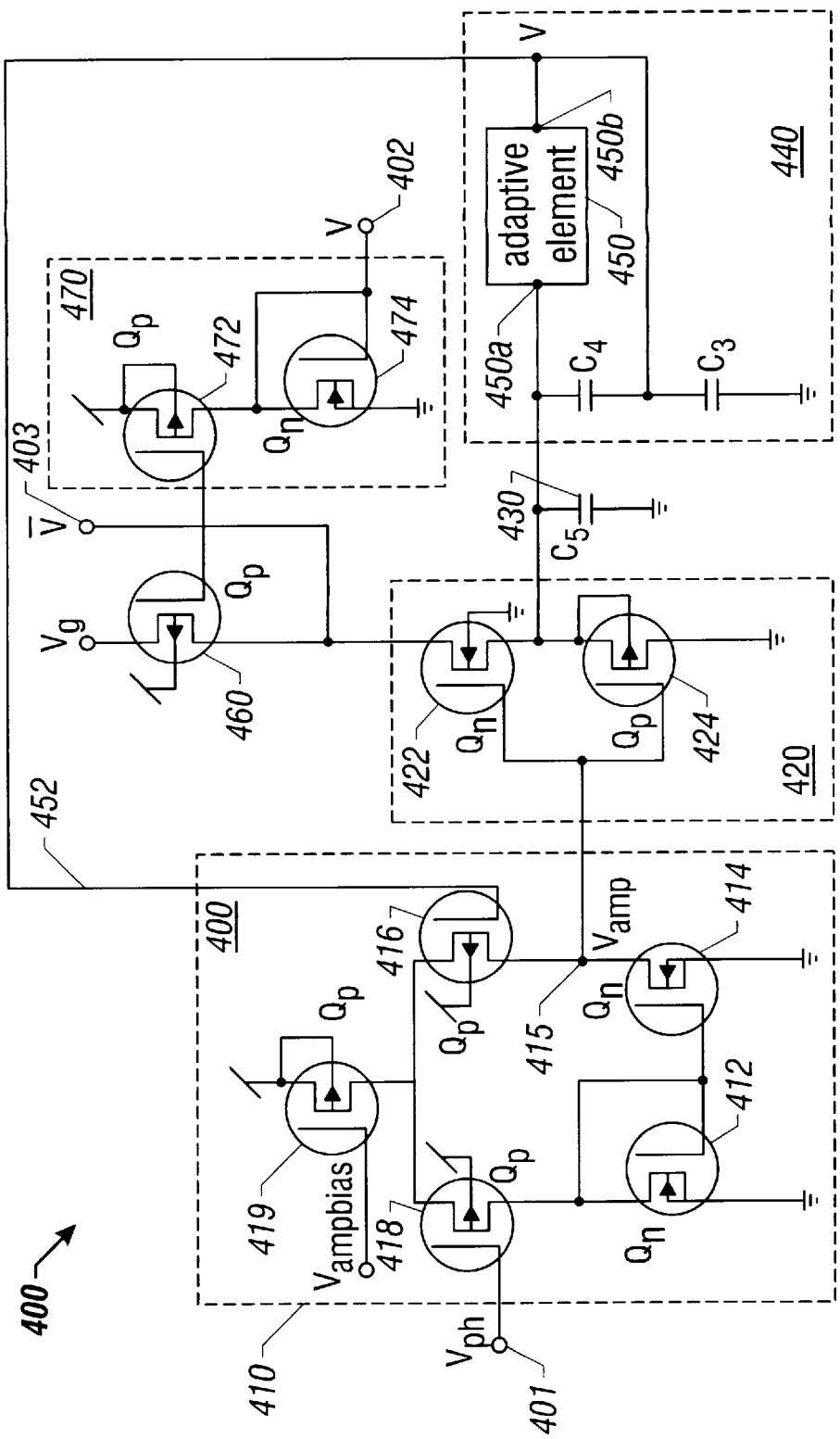
FIG. 4 is a diagram of a first embodiment of an integrated temporal-edge detector circuit having an amplifier and a rectifying temporal differentiator.

One embodiment 400 of the temporal-edge detectors 214, 224, and 234 is illustrated in FIG. 4. The edge detector 400 essentially performs amplification, differentiation, and rectification on the voltage signal $V_{ph}$ from the photosensor to provide the output voltage spike V and its complementary spike $\overline{V}$ in response to an irradiance transient from a stimulus. This embodiment includes the following functional blocks: a voltage amplifier 410, a current rectifier 420, a capacitor 430 as a voltage differentiator, a capacitive gain stage 440 with a slow adaptive element 450, a MOSFET 460 as a current sensor, and a voltage inverter 470. In addition, a feedback loop 452 feeds the output signal back to the amplifier 410. See, Kramer et al., "Pulse-based analog VLSI velocity sensors", IEEE Transactions on Circuits and Systems II: Analog and Digital Signal Processing, Vol. 44 (2), pp. 86–101 (1997), which is incorporated herein by reference.

FIGS. 7A, 7B, 7C, 7D, 7E and 7F show different circuits that may be used as the adaptive element 450 in the edge detector 400 of FIG. 4. The terminals 450a and 450b may be exchanged in implementation.

When the output voltage at node 415 of the amplifier 410 is sufficient to turn on either transistor 422 or 424, the drain current I at the transistor 460 induced by the voltage transient $dV_{ph}$ can be expressed by:

$$I = C_{tot}\left(\frac{C_3 + C_4}{C_4}\right)\frac{dV_{ph}}{dT}\Theta\left(\frac{dE}{dt}\right), \quad (6)$$

where $$C_{tot} = C_5 + \left(\frac{C_3 C_4}{C_3 + C_4}\right), \quad (7)$$

and Θ represents the Heaviside function: Θ(x)=1 for x>0 and Θ(x)=0 for x≦0. If the input voltage $V_{ph}$ at node 401 is equal to the output voltage $V_{ph}$ at the node 360 of the photosensor 300 in FIG. 3, The current can be represented by:

$$I = C_{tot}\left(\frac{C_3 + C_4}{C_4}\right)\left(\frac{C_1 + C_2}{C_2}\right)\left(\frac{kT}{q\kappa}\right)\frac{1}{E}\frac{dE}{dt} \quad (8)$$
$$= C_{tot}\left(\frac{C_3 + C_4}{C_4}\right)\left(\frac{C_1 + C_2}{C_2}\right)\left(\frac{kT}{q\kappa}\right)\upsilon\left(\frac{1}{E}\frac{dE}{dx}\right),$$

where υ is the speed of the stimulus, x is the spatial coordinate, and (dE/Edx) is the spatial contrast per unit distance of the stimulus. Therefore, the current through the transistor 460 is proportional to the speed and contrast of the stimulus.

The operating point of the amplifier 410 is set by feeding back the output voltage of the temporal differentiator 430 via the gain stage 440 through the feedback loop 452 to the inverting input of the amplifier 410. This feedback scheme is implemented to adjust the operating point of the temporal-edge detector to the DC level shifts of $V_{ph}$ caused by different illumination levels in the stimuli.

The transistor 460 converts the drain current pulse I into a negative voltage pulse $\overline{V}$ at the gate output. Subsequently, the voltage inverter 470 uses the pulse $\overline{V}$ as input to produce its complementary positive voltage pulse V. The voltage pulses V and $\overline{V}$ are the output signals from the edge detector 400 and are preferably used as the facilitation, triggering and inhibition signals for operating the FTI motion sensors.

A motion sensor in accordance with the invention is essentially a four-terminal circuit with three input terminals for receiving facilitation, triggering, and inhibition signals and one output terminal. In the bi-directional one-dimensional sensing system 200 of FIG. 2, each element has two motion sensors with each designated to detect motion in one direction. The motion sensor 226 at a position i is configured to sense stimuli moving to the right and the motion sensor 228 at the same position is configured to sense stimuli moving to the left. The motion sensors for the two opposing directions may be identical in circuit structure but have different input connections.

Figure 5:
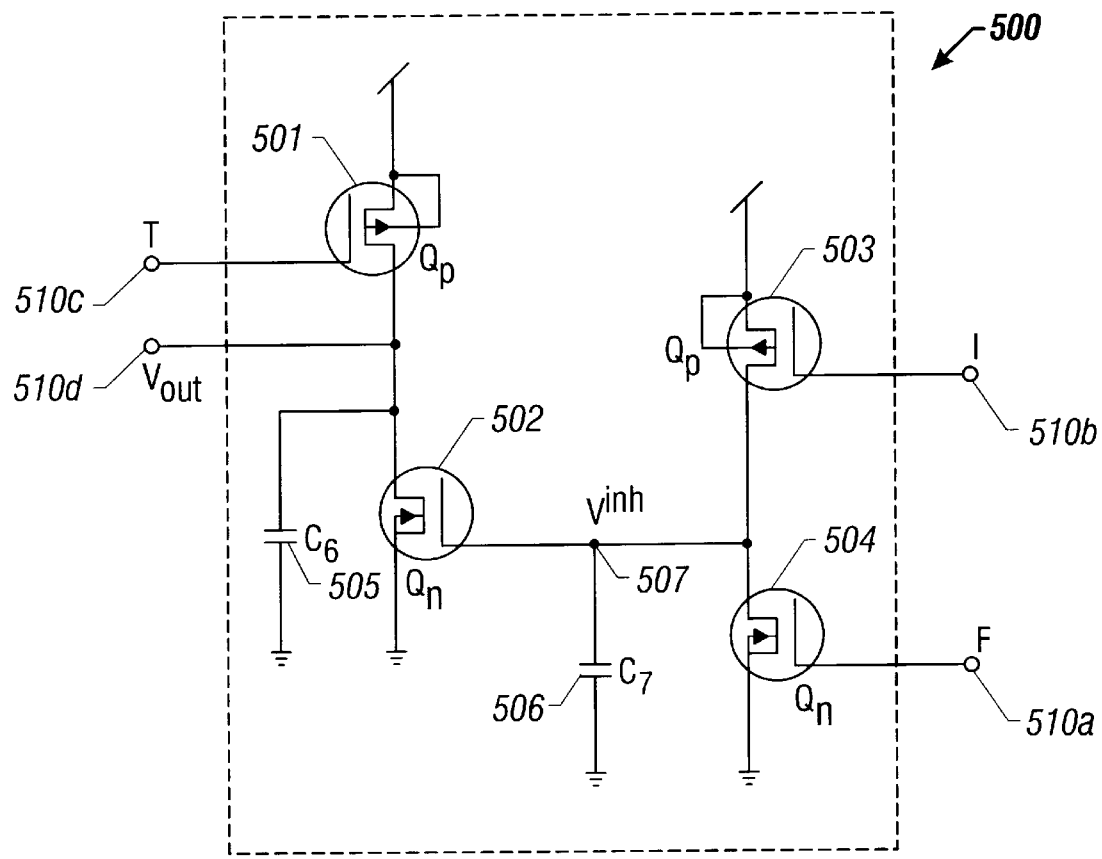
FIG. 5 is a diagram of a four-terminal circuit for the FTI motion sensor.

FIG. 5 shows one embodiment 500 of the motion sensors 226 and 228, respectively. This embodiment comprises transistors 501, 502, 503, and 504 and capacitors 505 and 506. Terminals 510a, 510b, and 510c are respectively implemented to receive a facilitation signal (F), an inhibition signal (I), and a triggering signal (T). An output voltage pulse $V_{out}$ at an output terminal 510d is facilitated or inhibited depending on whether an internal voltage $V^{inh}$ at an inhibition node 507 (i.e., the gate of the transistor 502) is low or high.

An operation of sensing a rightward motion is described as follows to illustrate the motion sensor 500. Referring to FIG. 2, when the motion sensor 500 is configured to function as the motion sensor 226, the terminal 510a is connected to the positive output terminal of the edge detector 214 in the left element 210 to receive a positive voltage spike $V_{i-1}$ as the facilitation signal (F) and the terminal 510b is connected to the negative output terminal of the edge detector 234 in the right element 230 to receive a negative voltage spike $\overline{V}_{i+1}$ as the inhibition signal (I). The triggering signal (T) for the motion sensor 226 is a negative voltage spike $\overline{V}_i$ from the negative output terminal of the edge detector 224. A stimulus moving from left to right is first detected by the edge detector 214 which produces a positive voltage spike $V_{i-1}$ at the facilitation signal input 510a to discharge the capacitor 506 ($C_7$) through the transistor 504. This action turns off the transistor 502 and thereby the initial inhibition. Thus, the motion sensor 226 is facilitated.

As a rightward moving stimulus passes across the photosensor 222 at position i, a negative voltage spike $\overline{V}_i$ generated by the edge detector 224 is fed to the triggering signal terminal to turn on the transistor 501. The capacitor 505 ($C_6$) is therefore charged up to initiate an output pulse $V_{out}$ at the output terminal 510d. Next, the stimulus moves to the right photosensor 232 at position (i+1) and causes the edge detector 234 to produce a negative spike $\overline{V}_{i+1}$. The motion sensor 226 receives the negative spike $\overline{V}_{i+1}$ as the inhibition signal (I) at the terminal 510b to turn on the transistor 503. This action causes recharging of the capacitor 506 ($C_7$) and thereby brings $V^{inh}$ at the node 507 to a high potential again so that the capacitor 505 ($C_6$) is discharged through the transistor 502 to terminate the output pulse $V_{out}$ at the terminal 510d.

For a stimulus moving from the right to the left relative to the element 220, the edge detector 234 first detects the stimulus and generates the inhibition signal (I) at the terminal 510b by producing the negative voltage spike $\overline{V}_{i+1}$. This action turns on the inhibition and prevents an output voltage pulse from being triggered in response to a succeeding spike from the triggering signal terminal 510c. The operation of the motion sensor 228 for sensing a leftward-moving stimulus is similar with the facilitation input provided by the edge detector 234 and the inhibition input by the edge detector 214.

A linear motion-sensing array of eight motion-sensing elements was built and tested to demonstrate the embodiment by using the photosensor 300, the edge detector circuit 400, and the motion sensor 500. A single-transistor adaptive element shown in FIG. 7D is used as the element 326 in the photosensor 300 and as the element 450 in the edge detector 400. In the photosensor 300, the terminal 450a of the adaptive element in FIG. 7D is connected to the $V_{ph}$ node and the terminal 450b to the $V_q$ node. The linear sensing array was fabricated using a 2-μm n-well CMOS process. Each sensing element of the linear motion-sensing array implementing the element 220 comprises 23 MOSFETs and nine capacitors with a total area of about 27,500 $\mu m^2$. The two motion sensors together have eight MOSFETs and four capacitors and cover an area of about 8,400 $\mu m^2$. The capacitors are made small in order to conserve space and to provide short rise and fall times for the output pulses. The element pitch, Δx, i.e., the spacing between two adjacent elements, is about 85 μm. The above configuration produces an element width of about 323 μm.

Figure 6A:
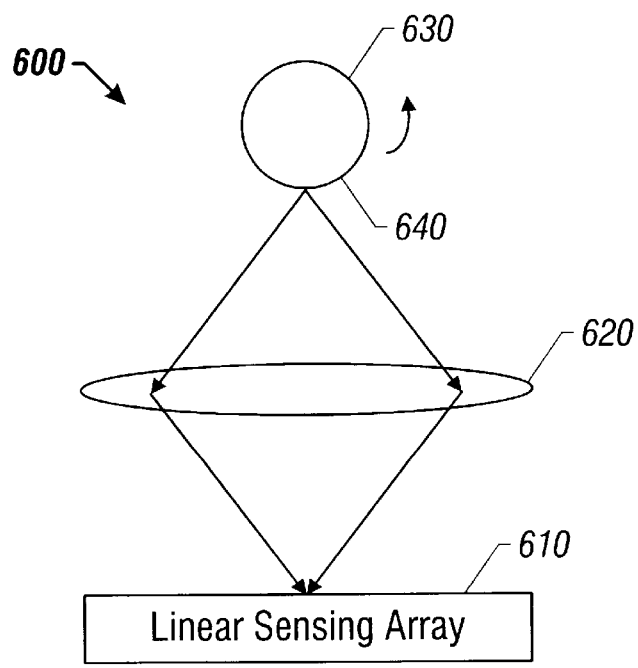
FIG. 6A shows an experimental layout for measuring the performance of a linear motion-sensing array.

FIG. 6A shows the experimental setup 600 that was used for measuring the performance of the linear sensing array 610. An imaging lens 620 imaged a moving object 640 onto the linear sensing array 610. The imaging lens 620 has a focal length f=13 mm and an f-number of 1.8. For quantitative measurements, sheets of paper with printed gray-scale patterns wrapped around a rotating drum 630 were used as the moving object 640 to provide the optical stimuli. The distance between the object and the lens was about 380 mm. A 56%-contrast ON edge was used as a stimulus for the measurements, unless otherwise noted.

Figure 6B:
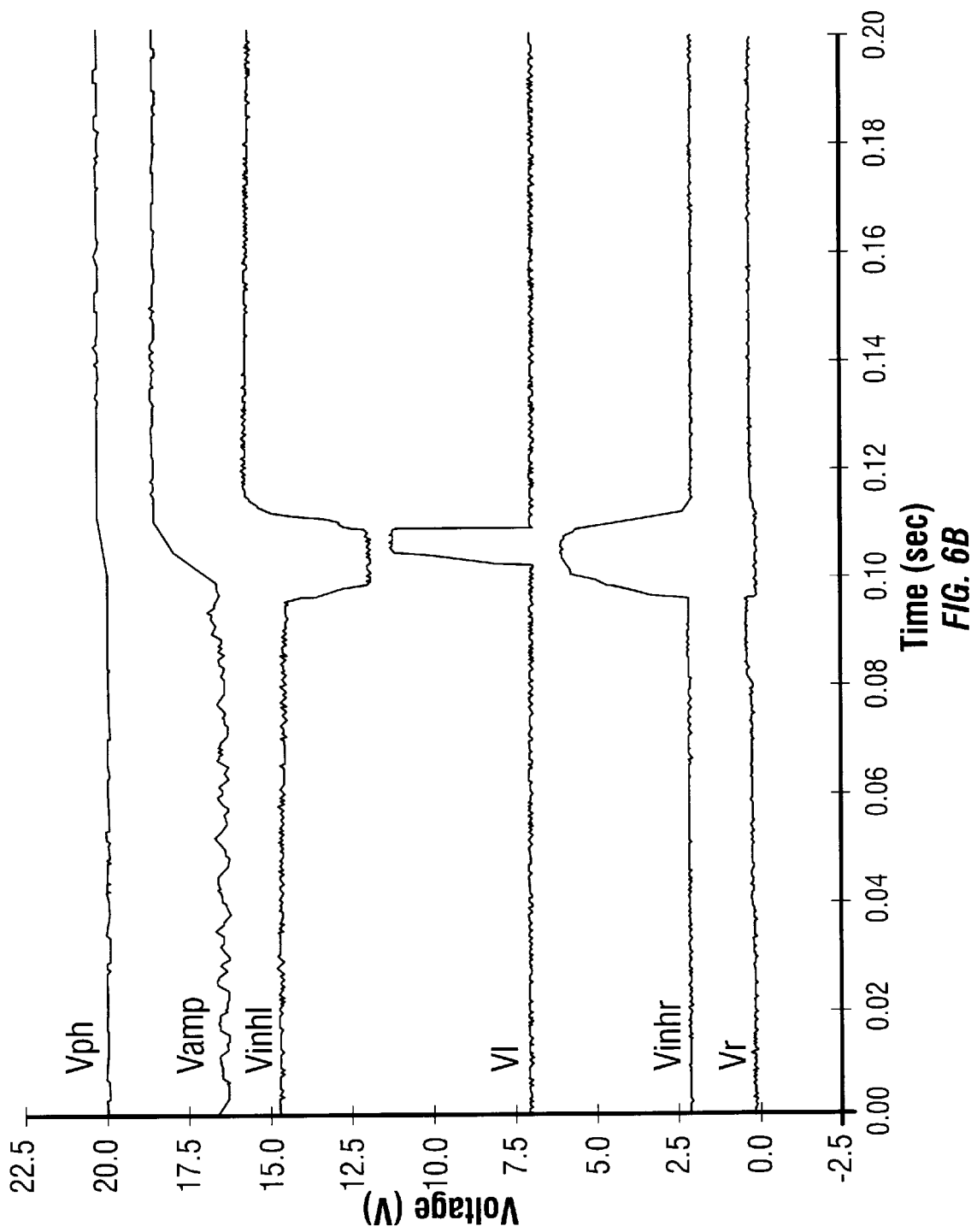
FIG. 6B is a chart of measured voltage signals at different nodes of an FTI motion-sensing element as a function of time in response to a 56%-contrast ON edge with circuits of FIGS. 1–5.

FIG. 6B shows measured voltage data as a function of time. The data was taken under normal room lighting provided by 60-Hz AC incandescent lamps. The white portions of a piece of paper as the moving object 640 provided an illuminance of about 1.2 lux onto the image plane of the sensing array 610. The different voltage traces represent output signals from different stages in the same sensing element in the linear sensing array 610. Trace 610a represents the output voltage $V_{ph}$ from the output terminal 360 of the photosensor 300 as a result of a leftward-moving ON-edge stimulus. $V_{ph}$, is amplified by the amplifier stage 410 of the edge detector 400 to produce a signal Vamp (trace 610b) at the output terminal 415. Traces 610c and 610d respectively represent the voltage signals $V_{inhl}$ at the inhibition node (i.e., node 507 of the motion sensor 500) and $V_l$ at the output terminal (i.e., terminal 510d of the motion sensor 500) of the motion sensor for sensing the leftward motion in the sensing element. Traces 610e and 610f respectively represent the voltage signals $V_{inhr}$ at the inhibition node (i.e., node 507 of the motion sensor 500) and $V_r$ at the output terminal (i.e., terminal 510d of the motion sensor 500) of the motion sensor for sensing the rightward motion in the sensing element.

The output voltage pulse for the preferred direction (i.e., the leftward direction) is facilitated by a low value $V_{inhl}$ during an adaptive time window, while the output voltage pulse $V_r$ for the null direction (i.e., the rightward direction) is inhibited by a high value $V_{inhr}$ during that time window. For better visibility, the voltage traces for $V_{ph}$ (trace 610*a*), $V_{amp}$ (trace 610*b*), $V_{inhl}$ (trace 610*c*), $V_l$ (trace 610*d*), and $V_{inhr}$ (trace 610*e*) are offset by 19 V, 16 V, 12 V, 7 V and 2 V, respectively. The element spacing of 85 μm corresponds to an angular resolution of 0.36° and a distance of 2.4 mm on the object via imaging of the lens 620. The pulse duration of $V_l$ is about 6.2 msec, corresponding to an image speed of about 13.7 mm/sec.

Figure 6C:
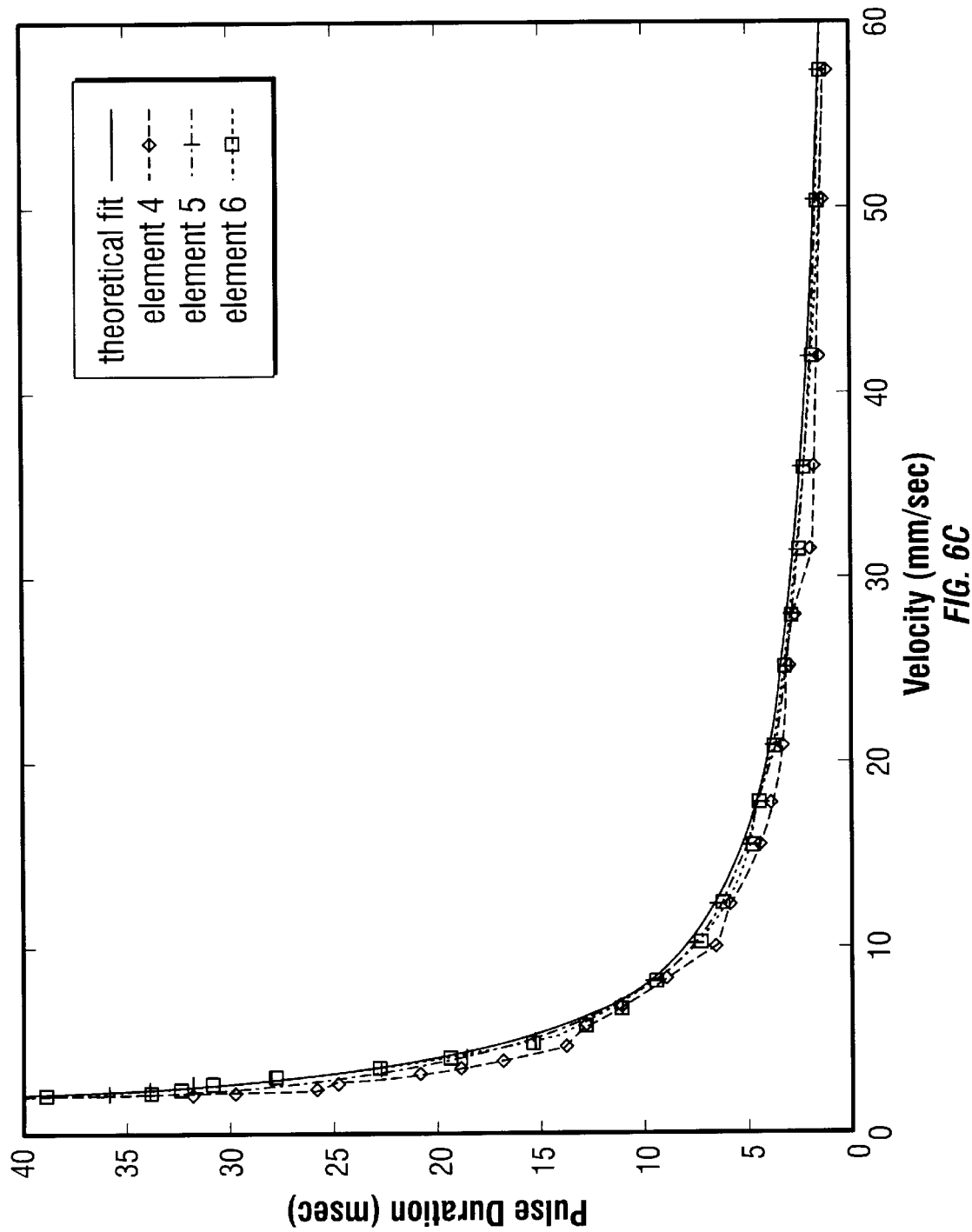
FIG. 6C is a chart showing output-pulse durations of three adjacent FTI motion-sensing elements in an array for the preferred direction of motion of a 56%-contrast ON edge versus image velocity for incandescent AC room illumination.

The output—pulse duration for the preferred direction as a function of the velocity in the image for the same stimulus and illuminance is plotted in FIG. 6C. The response curves for three adjacent elements and a theoretical curve as obtained from Equation (2) are shown. Each data point represents the average of eight measurements. The measured data agrees well with the theoretical prediction and the fixed-pattern noise is low. In the null direction, no output pulses were observed for the plotted speed range. For speeds higher than about 60 mm/sec, however, the circuit responds in the null direction as well. This is believed to be caused by the finite rise time of the inhibition signal, which for high speeds only becomes completely effective after the edge has reached the trigger location and the output voltage has already started to increase. The rise time of the inhibition signal is determined by the shape and amplitude of the voltage pulse from the edge detector (and thus by the sharpness and the contrast of the edge), by the gain of the amplifier, and by the size of the capacitor at the inhibition node. At the low speed end, the velocity range is limited by the decay-time constants, due to leakage currents, of output and inhibition pulses. For the used stimulus, inhibition in the null direction can be maintained for approximately 2.5 sec. corresponding to a speed of 0.034 mm/sec.

FIG. 6D shows the measured response of a motion-sensing element to the same stimulus under different incandescent illumination levels of 0.3 lux, 1.2 lux, 6.75 lux, and 27 lux. Each data point is an average value of six measurements. The measured results indicate that the response of the sensing array is very robust against changes in global light conditions over at least two orders of magnitude.

The effect of changing edge contrast and sharpness is shown in FIG. 6E. Contrast is defined here as the ratio of the difference and the sum of maximum and minimum irradiance. The response to sharp edge stimuli with different contrasts is compared with the response to a pattern whose gray value varies sinusoidally from dark to bright across a distance of 75 pixels. Six measurements taken under an illuminance of 1.2 lux were averaged per data point. For sharp edges with medium or high contrasts the response is insensitive to contrast variations. For very blurred edges the averaged output-pulse duration still depends monotonically on the velocity, but the response curve shifts slightly toward longer pulses, leading to an underestimation of the speed. The same qualitative behavior was observed for sharp edges with low contrasts. The slow positive irradiance transient caused by the sinusoidal stimulus occasionally triggered multiple edge signals at some pixels, leading to spurious long pulses representing low speeds in the null direction. The edge detector was operated at low gain by setting the bias voltage $V_{ampbias}$ at the transistor 419 in the amplifier stage 410 of the edge detector 400 such that the transistor 419 was in strong inversion to prevent the brightness modulations of the incandescent AC illumination from generating spurious output spikes. Under DC lighting conditions, the gain can be increased to extend the contrast invariance of the output signal down to lower contrasts.

Figure 8:
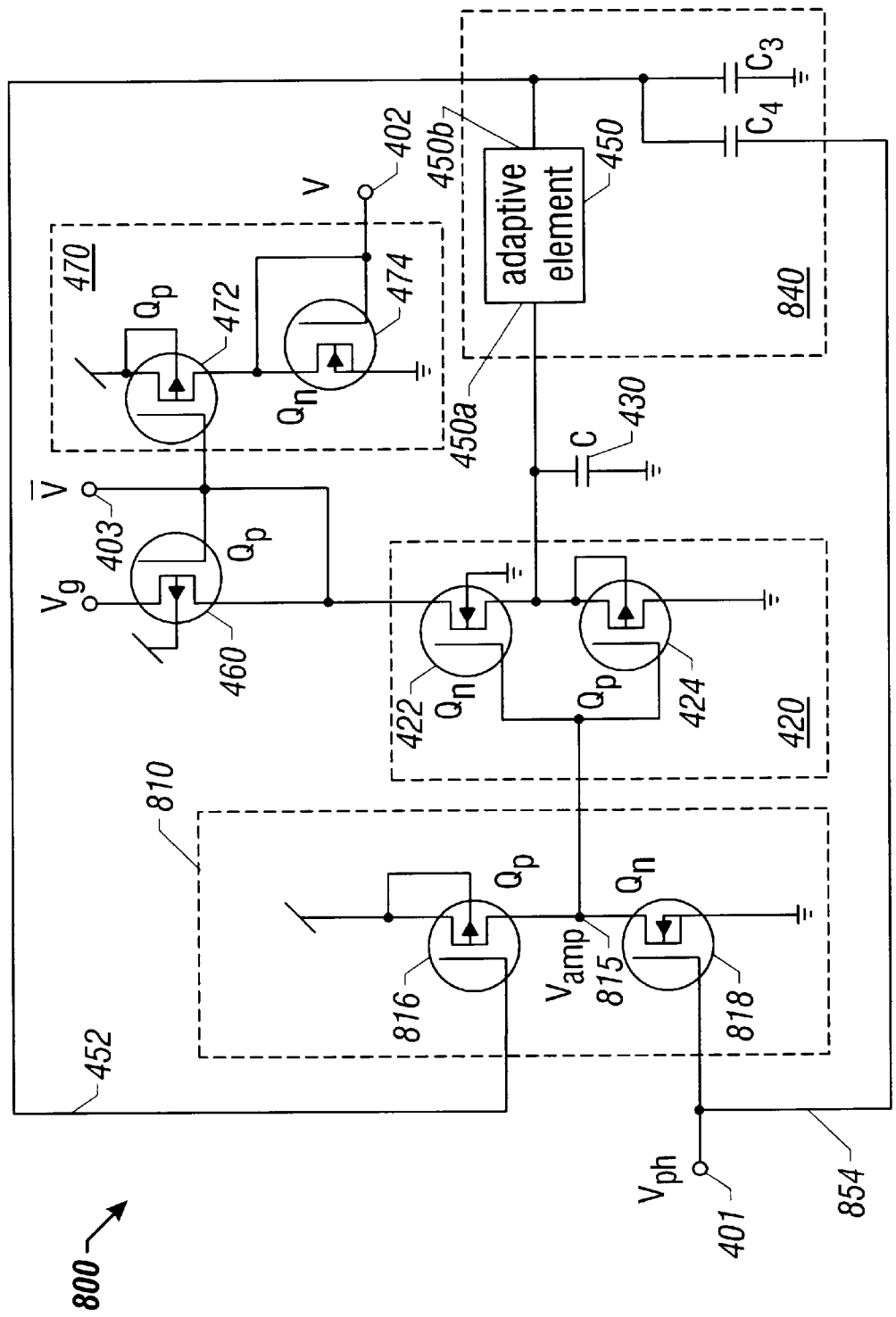
FIG. 8 is a diagram of a second embodiment of an integrated temporal-edge detector circuit having an amplifier and a rectifying temporal differentiator.

FIG. 8 shows an alternative embodiment of a temporal edge detector 800. This embodiment implements a two-transistor inverting amplifier 810, a capacitive gain stage 840, and an additional feedback loop 854. The capacitive gain stage 840 provides positive feedback from the input terminal 401 through the feedback loops 854 and 452 to the reference terminal of the amplifier at the gate of transistor 816. The capacitor $C_3$ or $C_4$ may be omitted in order to increase or decrease the transient gain. Generally, the terminals 450*a*, 450*b*, 815, and 401 may be capacitively coupled to one another in order to vary the transient grain. In addition, the two inverting inputs may be exchanged or the amplifier 810 may be replaced by any other voltage amplifier, e.g., the amplifier 410 shown in FIG. 4.

The above temporal-edge detectors are designed to respond to one edge type only, i.e., ON edges or OFF edges depending on the circuit. It may be desirable to use a temporal-edge detector that responds to both ON and OFF edges in environments with sparse edges in order to double the density of detectable image tokens. An additional current mirror comprised of n-type transistors may be implemented in the aforementioned temporal-edge detectors to detect both ON and OFF edges.

Figure 9A:
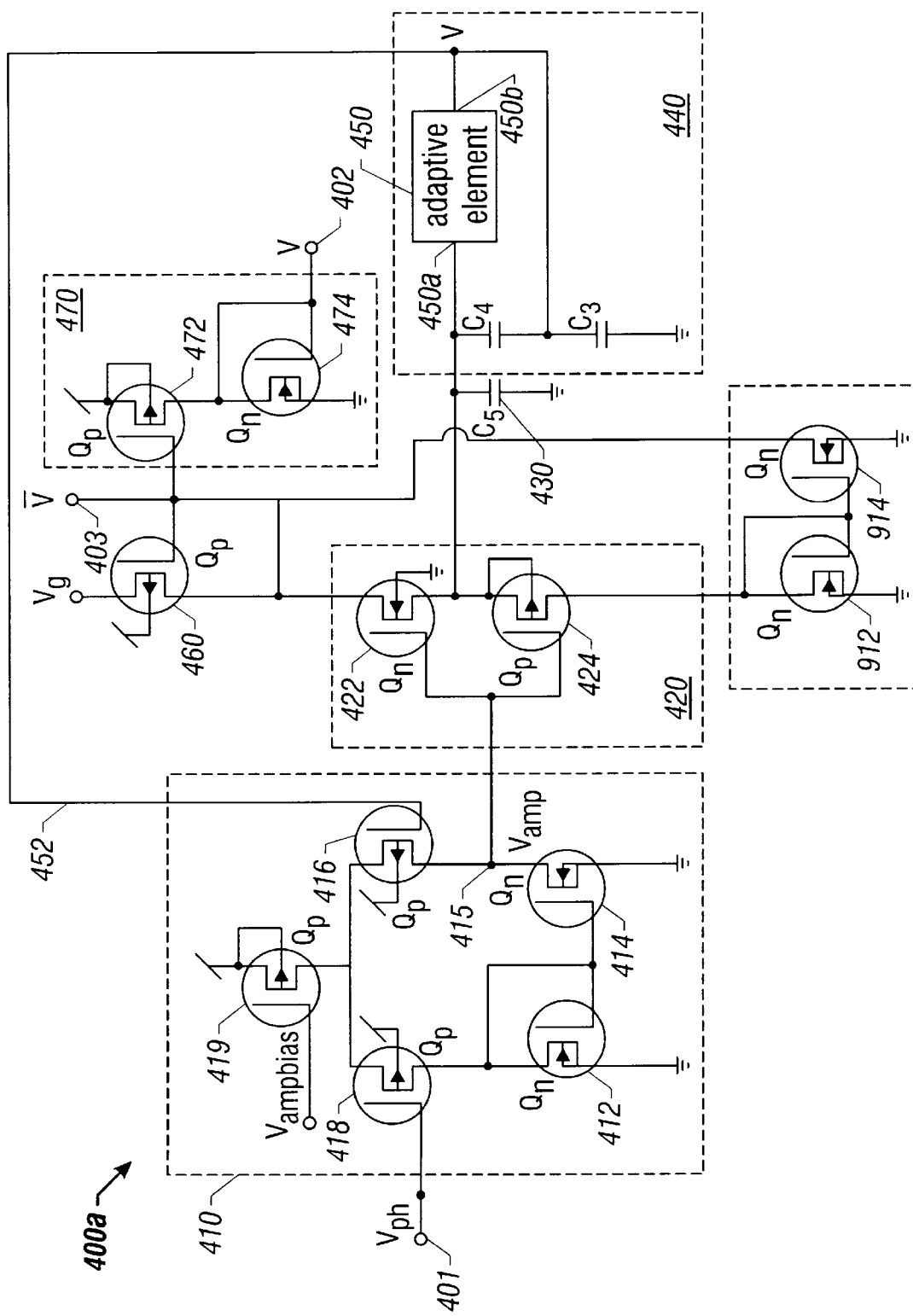
FIG. 9A is a diagram of a third embodiment of an integrated temporal-edge detector circuit having an amplifier and a rectifying temporal differentiator.
Figure 9B:
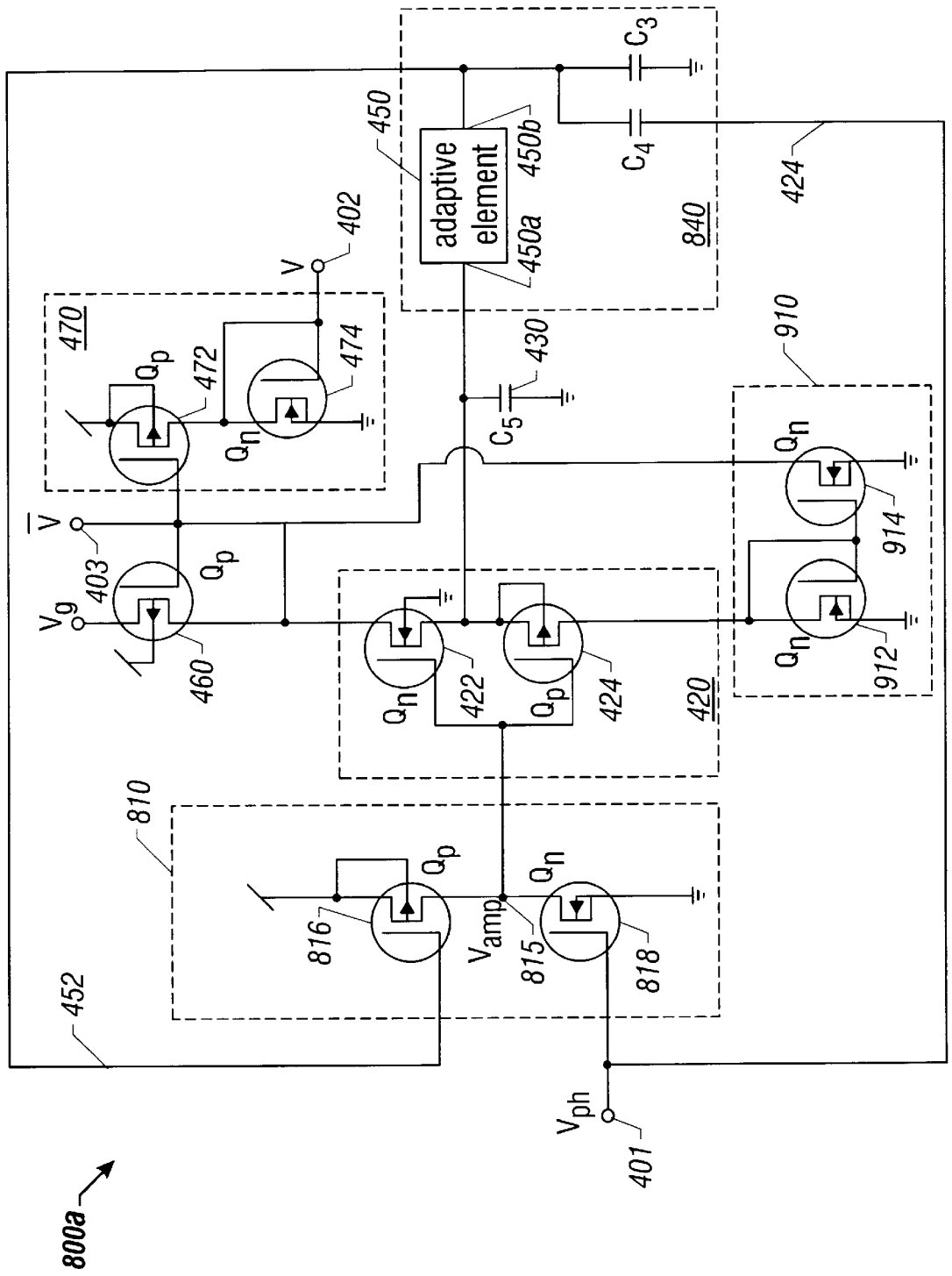
FIG. 9B is a diagram of a fourth embodiment of an integrated temporal-edge detector circuit having an amplifier and a rectifying temporal differentiator.

FIGS. 9A and 9B show modified temporal-edge detectors 400*a* and 800*a* that are each added with an n-type current mirror 910. The current mirror 910 has two n-type MOSFETs 912 and 914 with common source and gate nodes. The gates of the transistors 912 and 914 are both connected to the drain of the p-type transistor 424 of the current rectifier 420 and to the drain of the transistor 912. The sources of the transistors 912 and 914 are set at a common lower potential of the circuit, which may be the ground as shown. The drain currents of the transistors 912 and 914 are thus approximately equal to each other. The drain of the transistor 914 is connected to the gate and drain of the transistor 460 to produce a negative output pulse $\overline{V}$ at the terminal 403 in response to a negative voltage transient on terminal 415 and 815, respectively. The voltage at the terminal 403 is inverted by the voltage inverter 470 to produce a positive output pulse V at the terminal 402.

In the above edge detectors shown in FIGS. 4, 8, 9A and 9B, the operating point of the amplifiers 410 and 810 is set by feeding back the output voltage of the temporal differentiator 430 through the feedback loop 452 to the inverting input of the amplifier at the gate of the transistors 416 and 816 via the gain stage 440 and 840, respectively. The feedback loops 452, 854 and the gain stages 440, 840 may be omitted and the operating point may be set by a bias voltage applied to the gate of the transistor 416 and 816, respectively.

Alternatively, a temporal-edge detector may be constructed to separate the amplification stage and the subsequent temporal-differentiation stage so that the differentiation stage simply receives and processes the output signal $V_{amp}$ from the amplification stage. The amplification stage may even be omitted, since the photosensor 300 already includes an amplification circuit.

Figure 10:
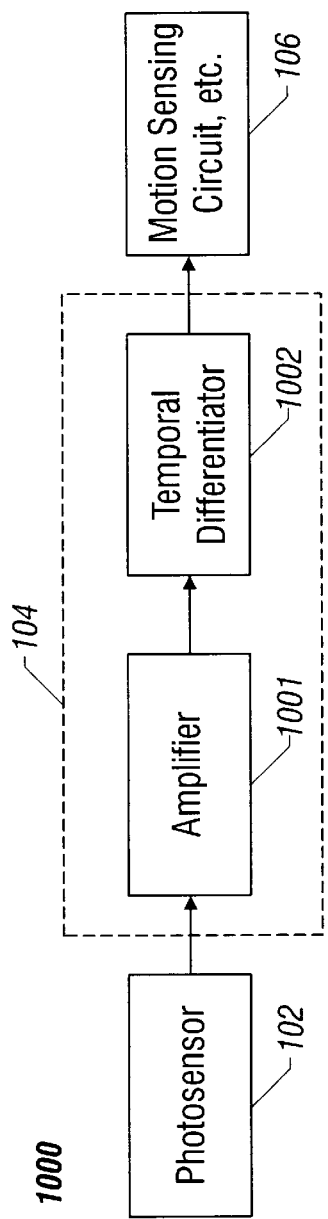
FIG. 10 is a block diagram showing functional units for a motion-sensing element in an array based on the embodiment of FIG. 1 with an edge detector circuit having an independent amplifier and an independent temporal differentiator.
Figure 11A:
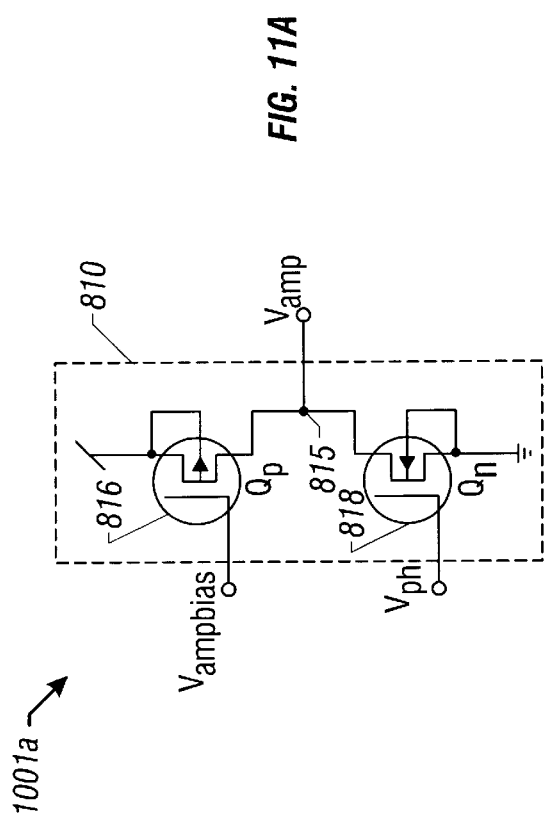
FIGS. 11A, 11B, and 11C are diagrams of exemplary independent amplifiers for the system shown in FIG. 10.
Figure 11B:
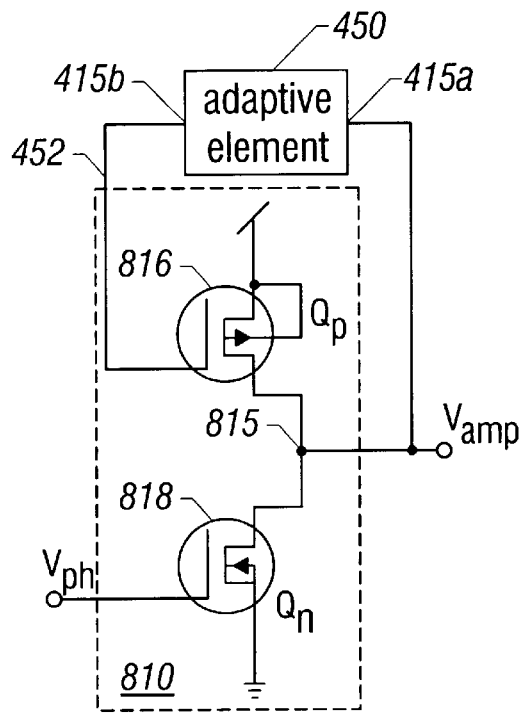
Figure 11C:
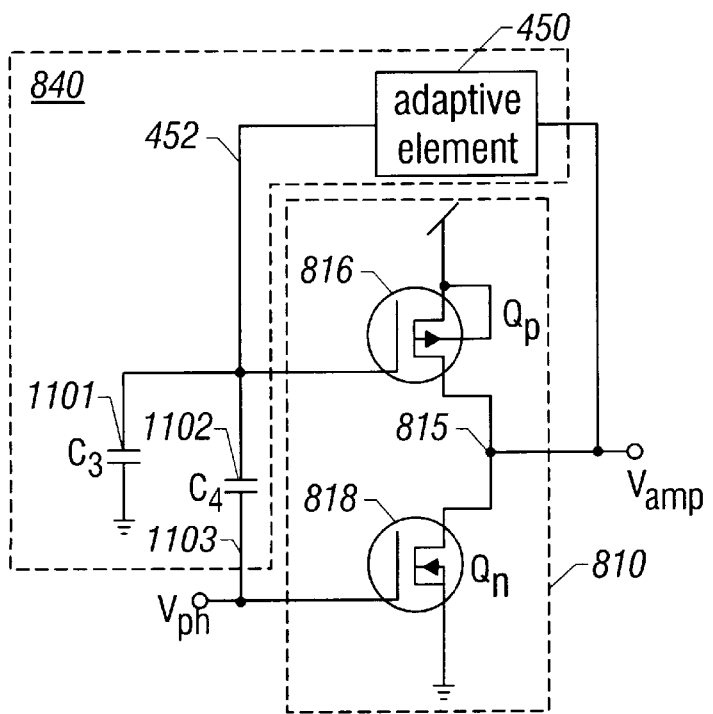

FIG. 10 shows a block diagram of a motion-sensing circuit having an edge detector 104 with separated amplifier 1001 and temporal differentiator 1002. Various amplification circuits may be used to implement the amplifier 1001. FIGS. 11A, 11B, and 11C show three exemplary embodiments.

In the embodiment 1001*a* in FIG. 11A, a p-type transistor 816 and an n-type transistor 818 are connected at their drains to form an inverting voltage amplifier 810 as in FIG. 8. The source of the transistor 816 may be set at a high potential and the source of the transistor 818 may be set at a low potential relative to the high potential (e.g., ground as shown). The output signal $V_{ph}$ from the photosensor 300 in FIG. 3 is fed into the gate of the transistor 818 as the input to the amplifier 1001a. A bias signal $V_{ampbias}$ is applied to the gate of the transistor 816 to set the operating point of the amplifier depending the DC level of the input signal $V_{ph}$. Alternatively, $V_{ph}$ may be applied to the gate of the transistor 816 and $V_{ampbias}$ to the gate of the transistor 818.

In the embodiment 1001b shown in FIG. 11B, a feedback loop 452 with an adaptive element 450 is implemented to feed the output signal $V_{amp}$ at the terminal 815 back to the gate of the p-type transistor 816. Similar to the feedback in the circuits 400, 800, 400a, and 400b respectively shown in FIGS. 4, 8, 9A and 9B, this feedback is used to dynamically adjust the operating point of the amplifier 1001b to the DC variation in the input signal $V_{ph}$ caused by different illumination levels in the received stimuli. Any of the circuits in FIGS. 7A–7F with either polarity may be used as the adaptive element 450.

The embodiment 1001c in FIG. 11C adds capacitors 1101 and 1102 to the embodiment 1001b to form a capacitive gain stage 840 with the adaptive element 450 in a positive feedback loop as in the temporal-edge detector 800 by using an additional feedback 1103 from the input terminal to the gate of the transistor 816 through the capacitor 1102. This configuration capacitively couples the gates of the transistors 816 and 818.

Alternatively, the capacitor 1102 may be connected in parallel to the adaptive element 450 to form a capacitive gain stage 440 in a negative feedback loop as in the temporal-edge detector 400 of FIG. 4. The capacitor 1101 or 1102 may also be omitted. The voltage amplifier 810 in the embodiments 1001a, 1001b, and 1001c may have exchanged inputs or may be replaced by any other voltage amplifier, e.g., the amplifier 410 shown in FIG. 4.

Figure 12A:
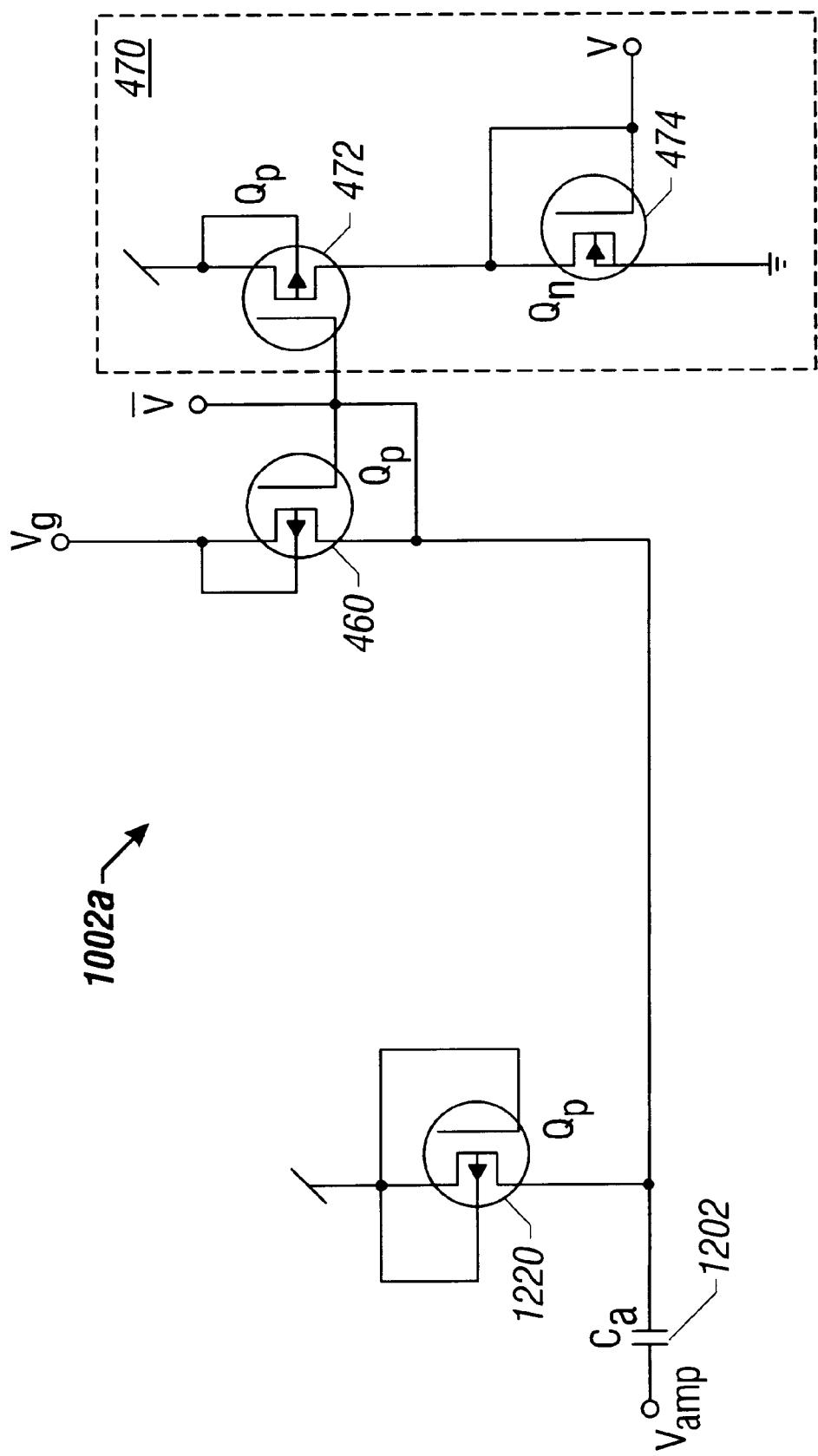
FIGS. 12A and 12B are diagrams of exemplary independent temporal differentiators for the system shown in FIG. 10.

FIG. 12A shows one implementation 1002a of the temporal differentiator 1002 shown in FIG. 10. This circuit is designed to respond to one edge type only (e.g., ON edges). The temporal differentiator 1002a has the following functional blocks: a capacitor 1202 as a voltage differentiator, a p-type transistor 1220 with the gate connected to the source to prevent the differentiator from overshooting beyond a given reference voltage, a p-type transistor 460 as a current sensor, and voltage inverter 470. If the source of the p-type transistors 460 and 472 are both connected to the same reference voltage as the source of the transistor 1220, the DC output voltage $\overline{V}$ is at that same reference potential and the DC output voltage V is at the source voltage of the n-type transistor 474, which may be ground, as shown. No DC currents flow through the circuit. In an alternative embodiment, the capacitor 1202 and the transistor 1220 can be replaced by the capacitor 430 and the current rectifier 420.

Figure 12B:
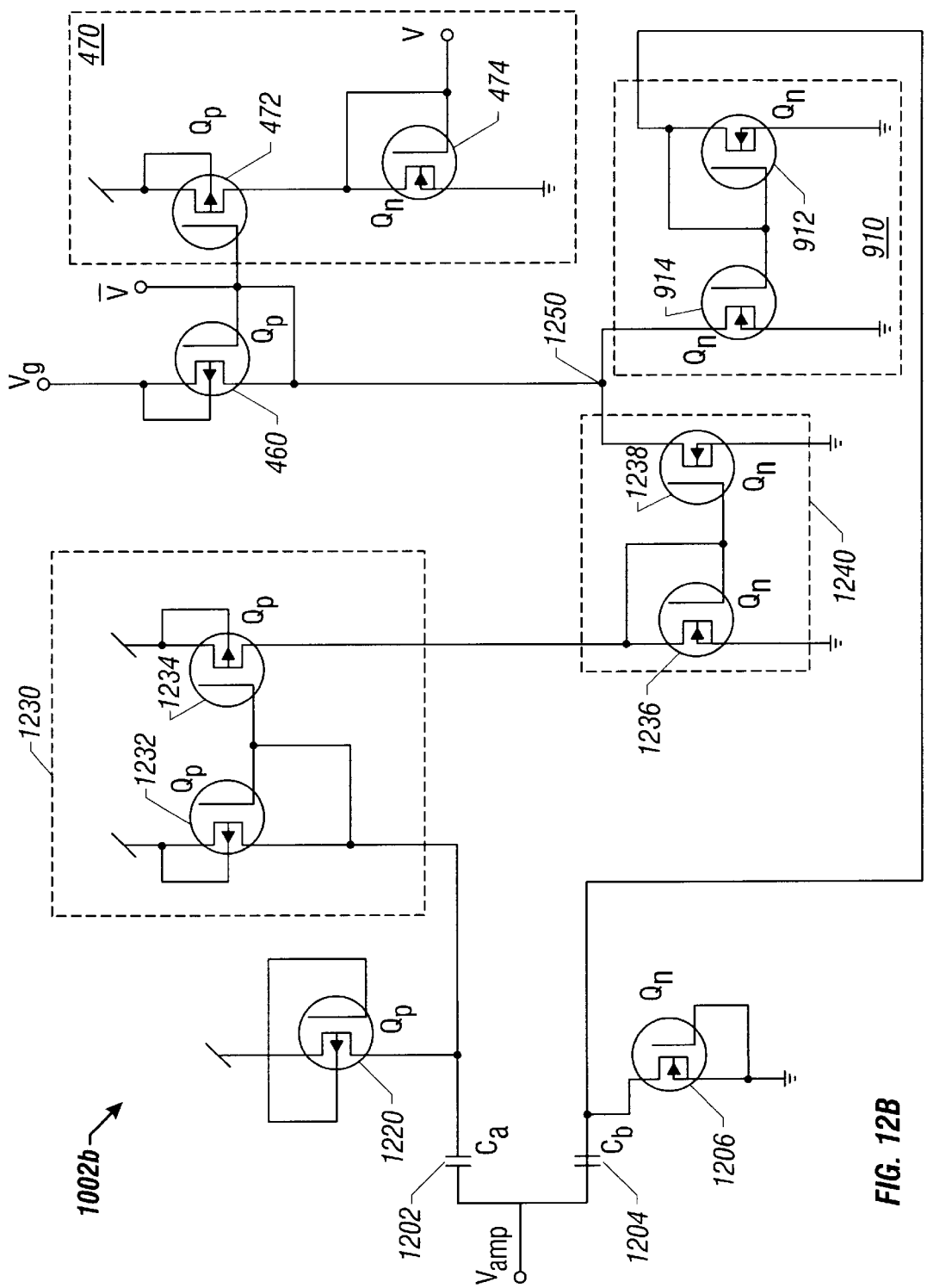

FIG. 12B shows another implementation 1002b of the temporal differentiator 1002 shown in FIG. 10. This circuit is designed to detect both ON and OFF edges. A separate pathway for the other edge type (e.g., OFF edges) is incorporated with a capacitor 1204 as the voltage differentiator, an n-type transistor 1206 with the gate connected to the source to prevent the differentiator output voltage from undershooting below ground and an n-type current mirror 910. The output current of the current mirror 910 at the node 1250 is essentially a copy of the rectified output current of the differentiator 1204. A copy of the rectified output current of the differentiator 1202 is also produced at the node 1250 via the p-type current mirror 1230 and the n-type current mirror 1240. These two currents at the node 1250 are then sensed by the current sensor 460 to produce the output voltage $\overline{V}$ and the output voltage V via the voltage inverter 470.

An alternative embodiment uses a capacitor 430, a current rectifier 420, a current mirror 910, a current sensor 460, and a voltage inverter 470, which are connected as in FIG. 9A.

A linear array based on the system 1000 was built by using the photosensor 300 of FIG. 3, the amplifier 1001b of FIG. 11B having the adaptive element in FIG. 7D, the temporal differentiator 1002a in FIG. 12A, and the motion sensor 500 in FIG. 5 in the configuration shown in FIG. 2. The fabrication was done by using a 2-$\mu$m n-well CMOS process. Each element of the linear array implementing the sensing element 220 of FIG. 2 comprises nineteen MOSFETs and seven capacitors with a total area of about 23300 $\mu m^2$. The element pitch is about 60 um and the element width is about 388 $\mu$m. The setup shown in FIG. 6A was used to test the chip by using an imaging lens with a focal length of 8 mm and a distance between the object and the lens of 250 mm. This configuration corresponds to an angular resolution of about 0.42° and a resolution of about 1.8 mm on the object.

The circuit was tested by using OFF edges with different on-chip speeds ranging from 0.047 mm/s to 208 mm/s. This speed range was limited by the capabilities of the rotating drum used to drive the stimulus.

Figure 13A:
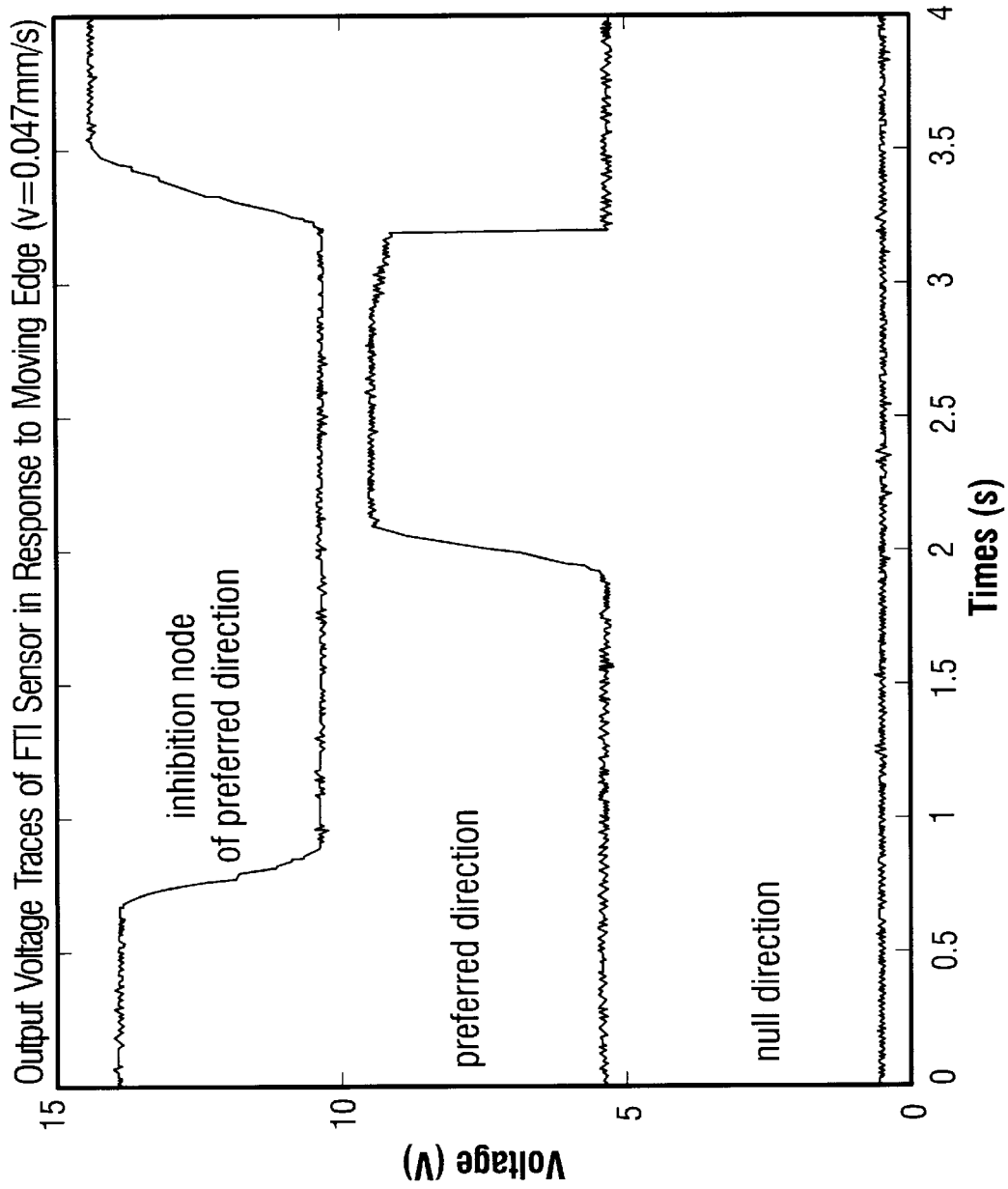
FIGS. 13A and 13B are charts of measured voltage signals at different nodes of an FTI motion-sensing element as a function of time in response to 92%-contrast OFF edges moving at 0.047 mm/s in two opposite directions based on the embodiment of FIG. 10.
Figure 13B:
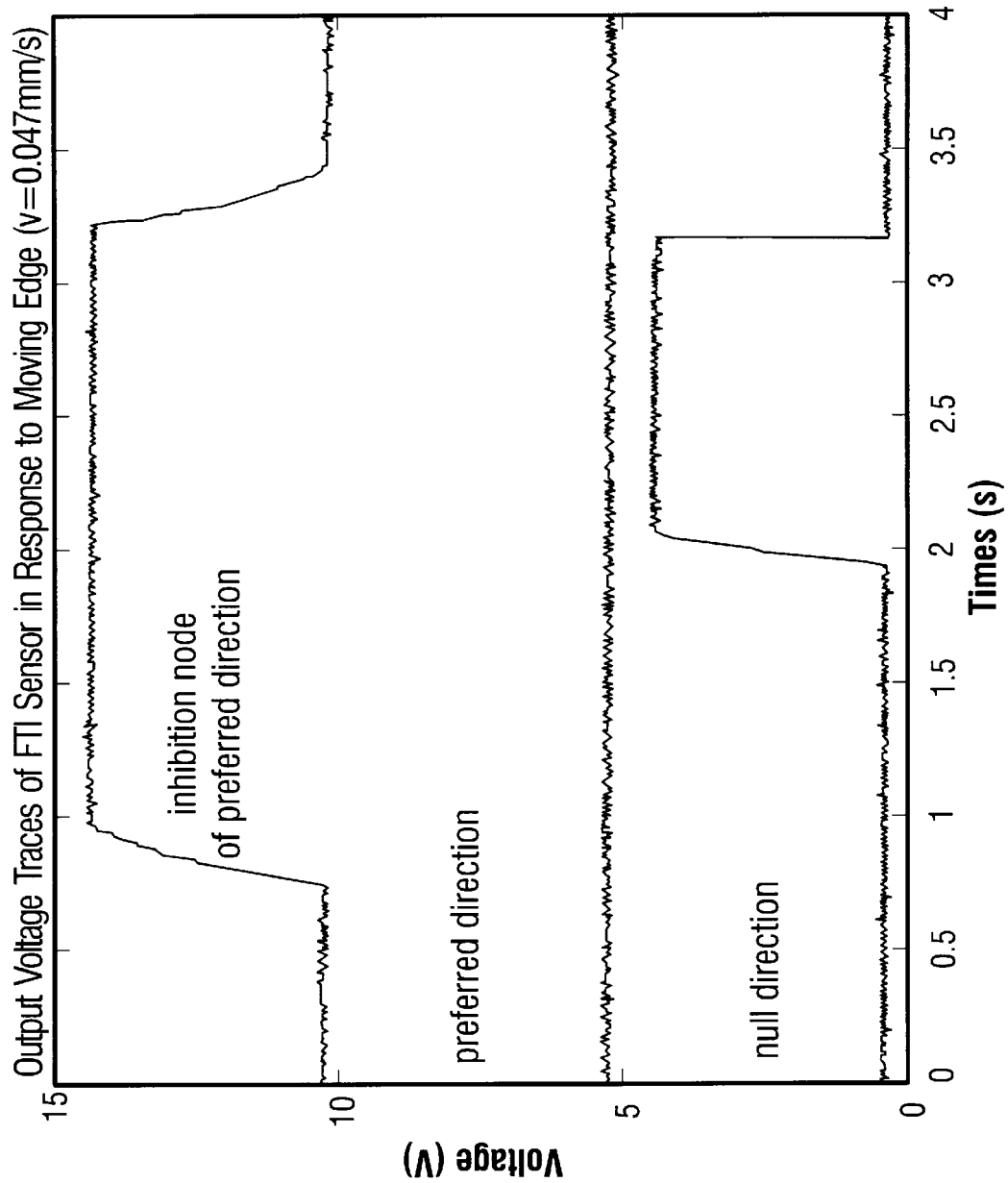

FIGS. 13A and 13B show measured voltage signals at different terminals in the motion sensors in response to a 92%-contrast OFF edge moving in two opposite directions at a speed of 0.047 mm/s. The top trace in each figure represents the voltage at the inhibition node (i.e., node 507 in FIG. 5) of one motion sensor, the middle trace represents the output signal of that same motion sensor, and the bottom trace represents the output signal of the motion sensor configured for sensing motion in the opposite direction.

Figure 13C:
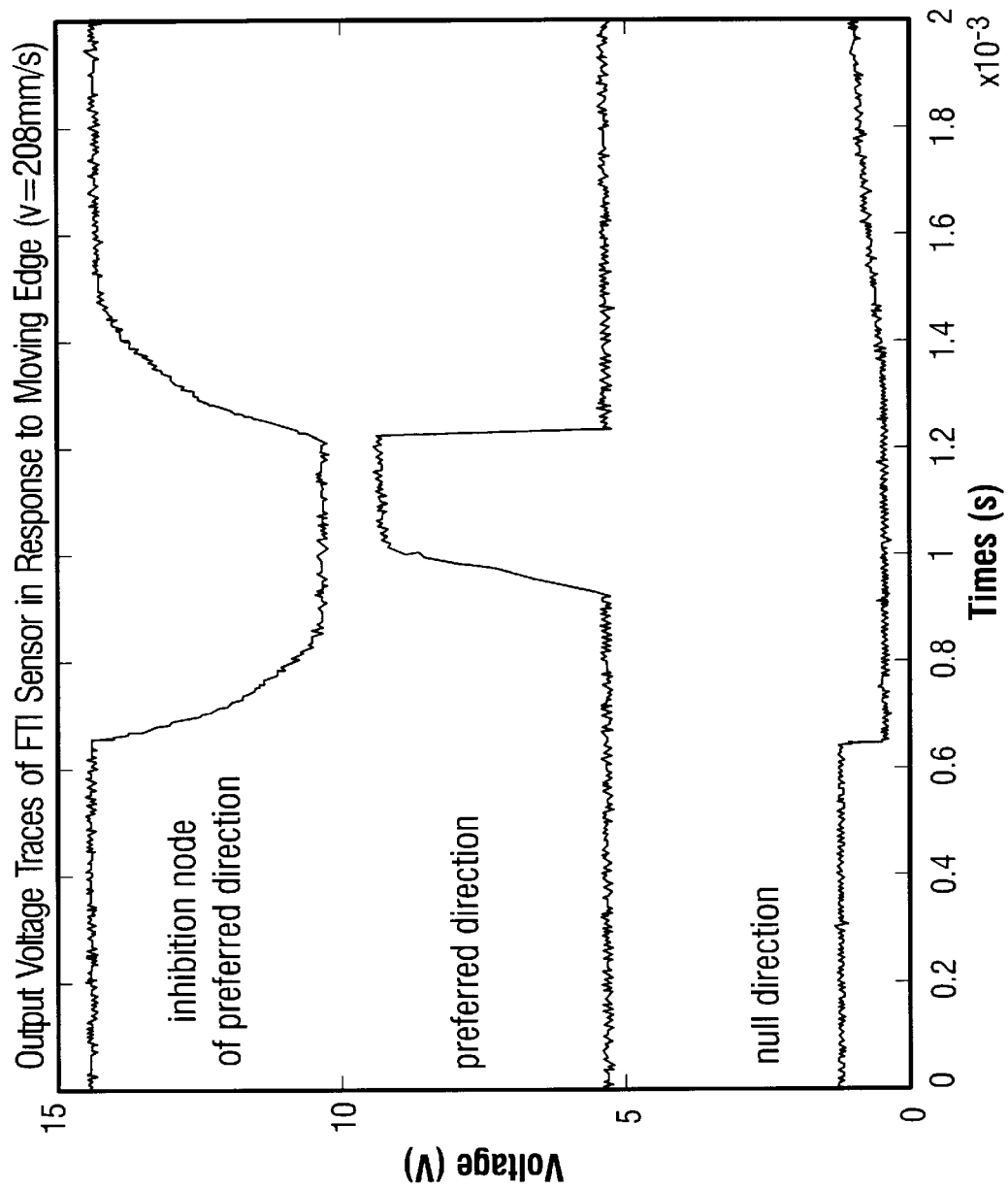
FIGS. 13C and 13D are charts of measured voltage signals at different nodes of an FTI motion-sensing element as a function of time in response to 92%-contrast OFF edges moving at 208 mm/s in two opposite directions based the embodiment of FIG. 10.
Figure 13D:
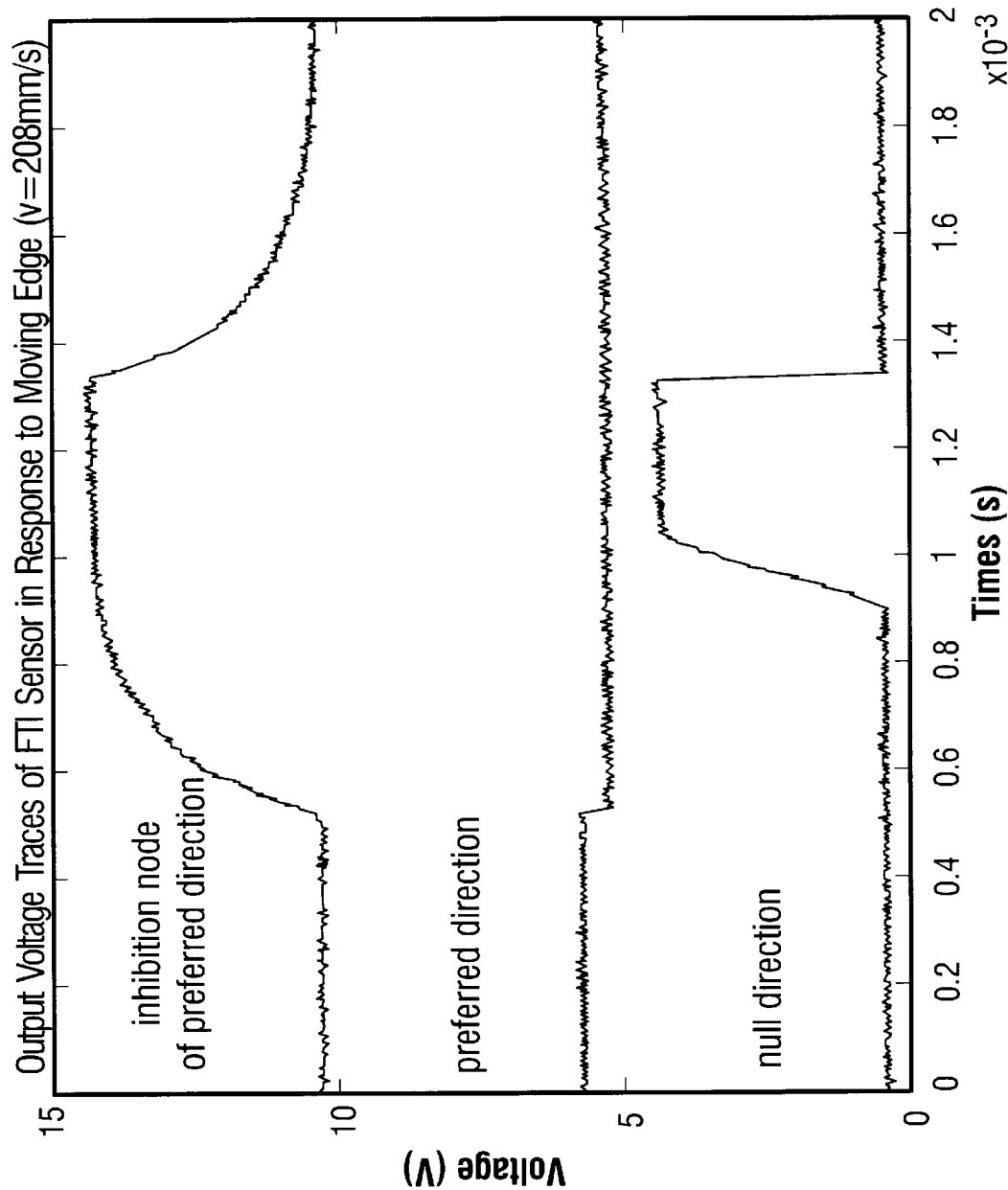

FIGS. 13C and 13D show the measured signals at the same terminals of the above circuit in response to a 92%-contrast OFF edge moving in two opposite directions at a speed of 208 mm/s.

Figure 14A:
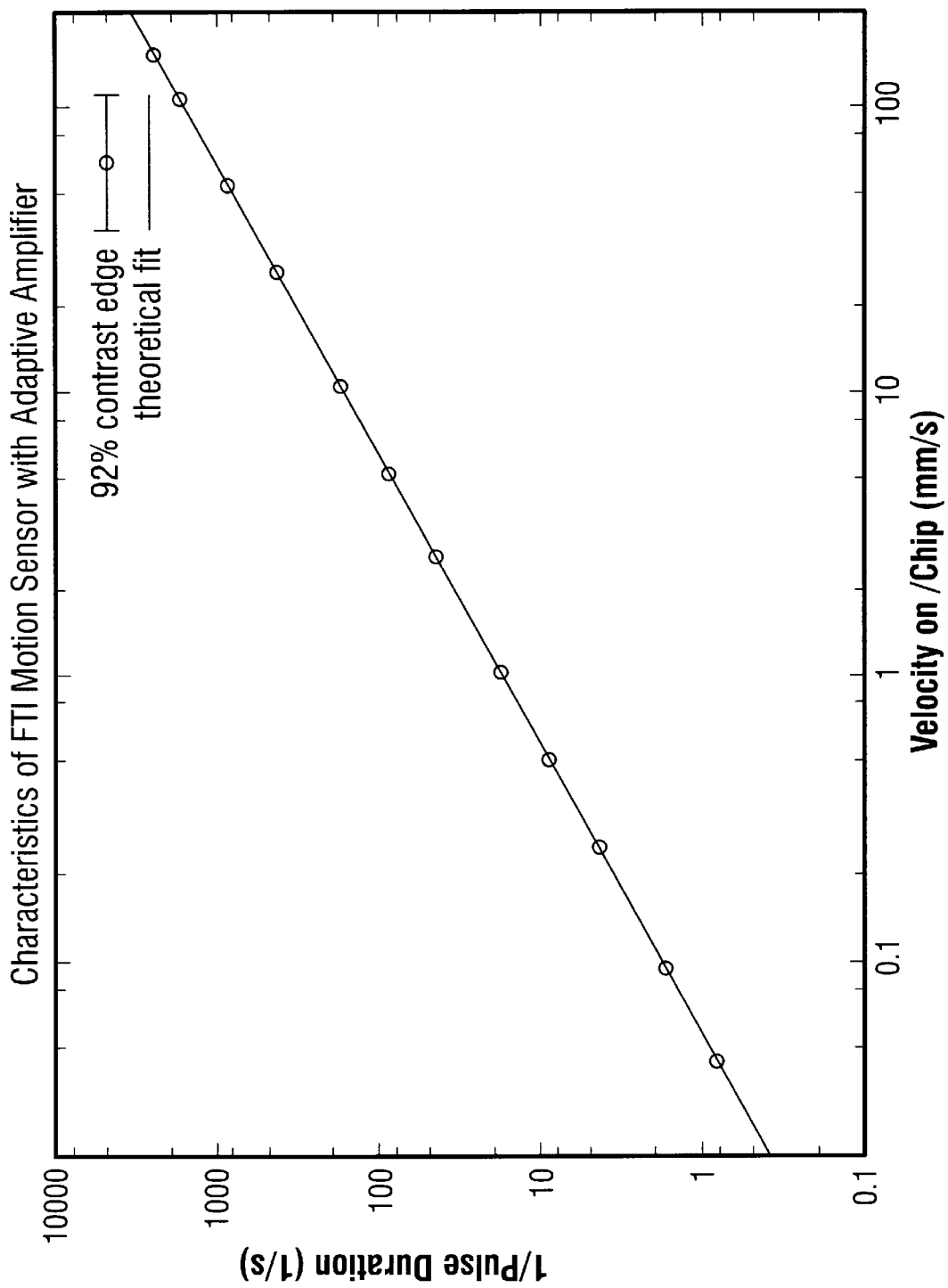
FIG. 14A is a chart showing the measured pulse duration as a function of the speed of the 92%-contrast OFF edge.
Figure 14B:
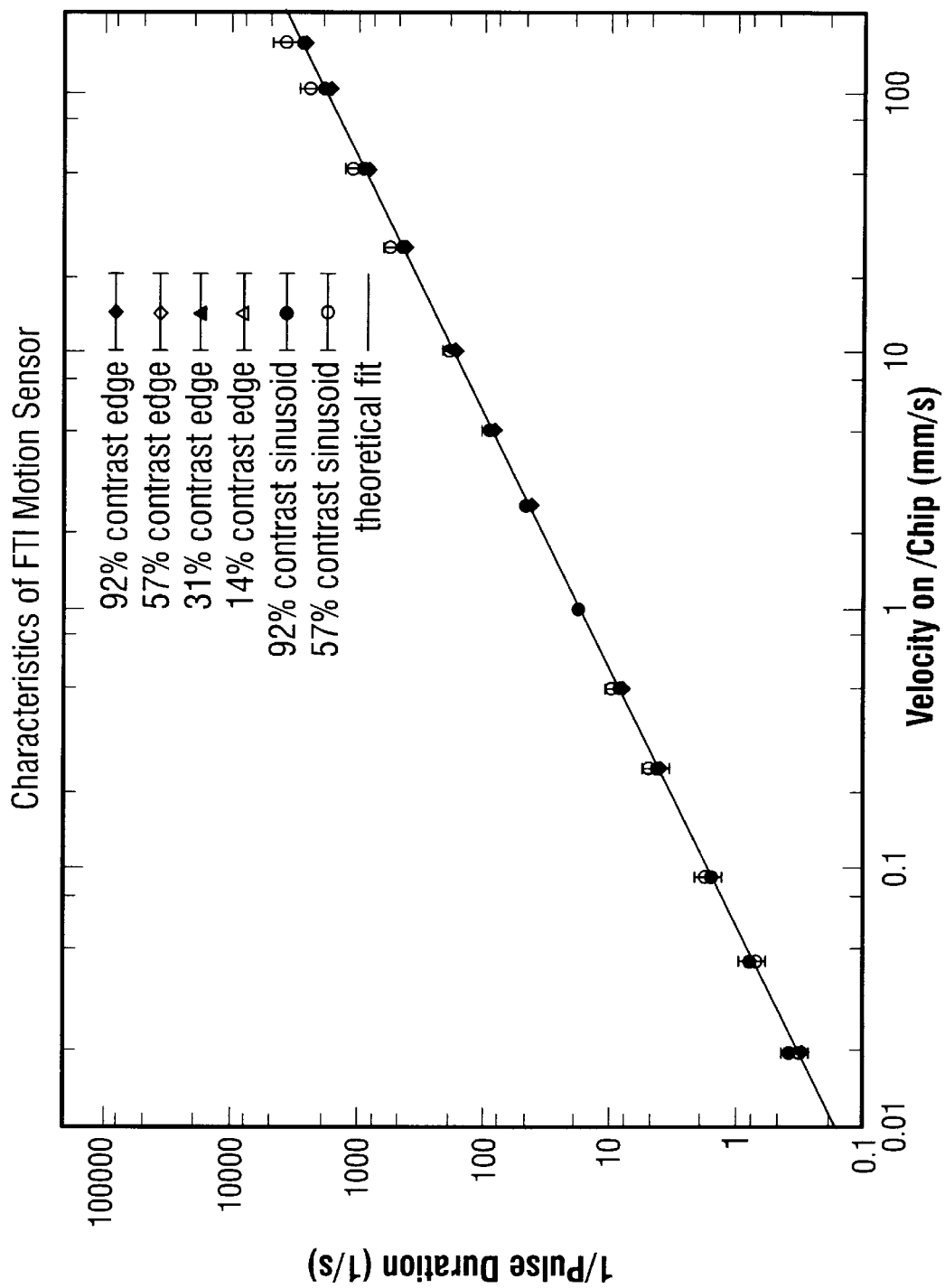
FIG. 14B is a chart showing the measured pulse duration as a function of the speed of features of different contrasts.

FIG. 14A is a chart showing the measured pulse duration as a function of the speed of the 92%-contrast OFF edge. FIG. 14B further shows the measured pulse duration as a function of the speed of features of different contrasts. Clearly, the response of a FTI motion sensor remains substantially unchanged for different contrasts.

The one-dimensional motion sensing circuit 200 of the FIG. 2 can be extended to sense motion along several directions in two dimensions. A motion-sensing element can be configured to measure movements of a stimulus along two or more non-parallel axes. Along each axis, the circuit configuration is similar to the one-dimensional sensing circuit of FIG. 2. Measurements of the motion of a stimulus along two or more non-parallel axes allow determination of the motion in the plane of the sensing circuit.

Figure 15:
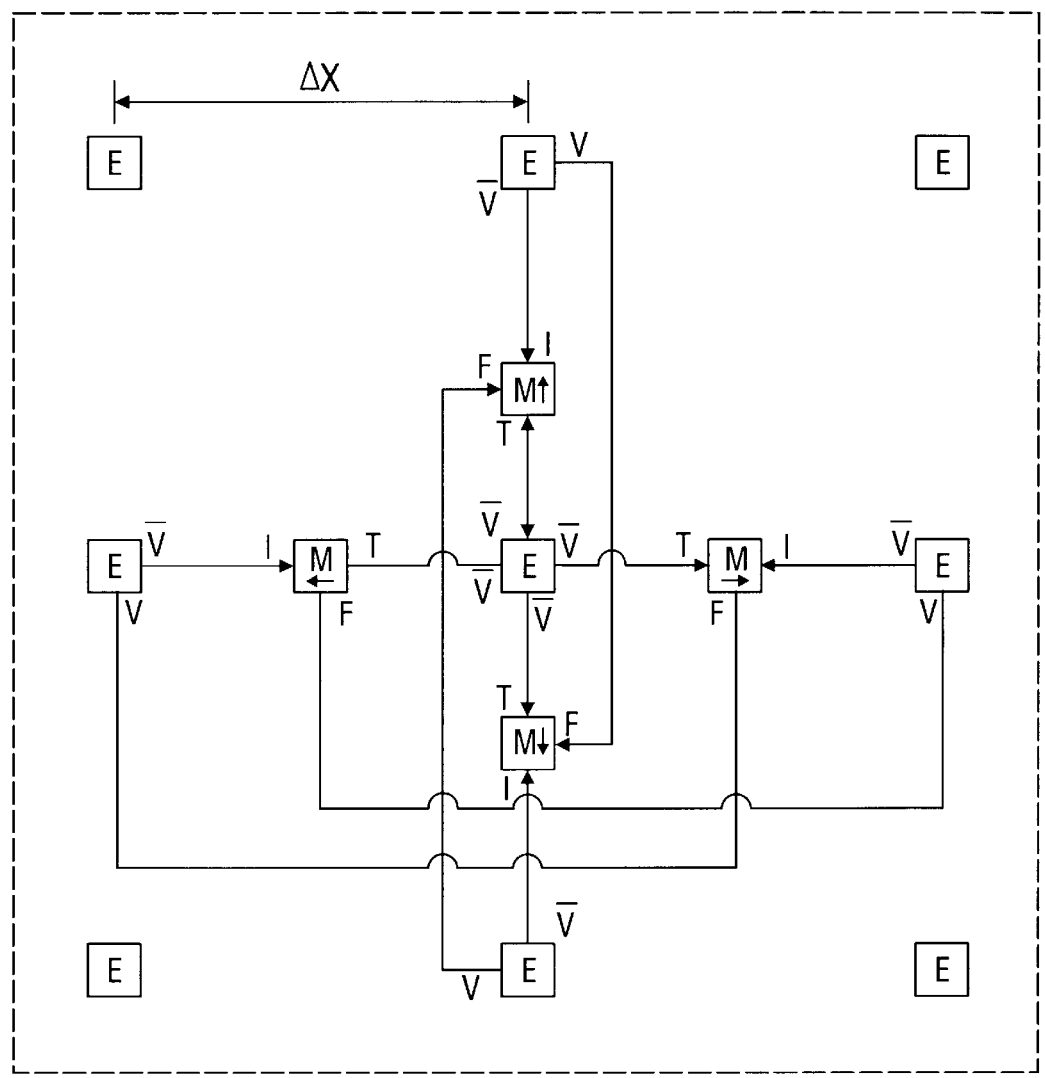
FIG. 15 shows an embodiment of a two-dimensional FTI motion-sensing array based on the system shown in FIG. 2.

FIG. 15 shows one embodiment of a motion-sensing array where sensing elements are arranged in mutually orthogonal rows and columns. For simplicity, only one sensing element with eight neighboring edge detectors is shown. The edge detector "E" in each sensing element is configured to provide triggering signals to four adjacent motion sensors "M" with two designated to sense opposite motions in the column direction and two designated to sense opposite motions in the row direction. The time of travel between two adjacent photosensors is a vector $\vec{\tau}$:

$$\vec{\tau} = \begin{pmatrix} \tau_x \\ \tau_y \end{pmatrix} = \frac{\Delta x}{\upsilon} \cdot \frac{\vec{\upsilon}}{\upsilon}, \quad (9)$$

where $\Delta x$ is the spacing between adjacent photosensors and is assumed to be the same for both x and y directions, $\upsilon$ is the relative speed of a stimulus with respect to the sensing array, and $\vec{\tau}$ is the velocity vector of the stimulus relative to the sensing array.

The circuit in FIG. 15 has been demonstrated with a two-dimensional array of 6×7 temporal-edge detectors and 4×5 functional motion sensors using the photosensor 300, the amplifier 1001a, the temporal differentiator 1002a, and the motion sensor 500. A 2-$\mu$m n-well CMOS process was used.

Although the present invention has been described in detail with reference to a number of particular embodiments, various modifications and enhancements may be made without departing from the spirit and scope of the invention.

For example, the circuits as described are grouped according to their functions for convenience in explaining their operations and relative relations. In actual implementation of these circuits, the electronic components may not be physically grouped as shown in the figures due to practical considerations such as performance, noise reduction, manufacturing process and circuit integration.

Motion sensing circuits in FIGS. 2 and 15 use adjacent photosensors to produce the facilitation, triggering, and inhibition signals for motion sensors. In general, the photosensors only need to be spatially displaced from one another along the direction of the relative motion of a stimulus and may not be adjacent. In addition, a signal produced by each photosensor may be used to produce facilitation, triggering, and inhibition signals at the same time for different motion sensors and each of the facilitation, triggering, and inhibition signals may be further used to drive different motion sensors (e.g., several motions sensors associated with a particular position responsive to different directions).

Furthermore, the bulk of all MOSFETs may be connected to potentials different than the ones shown in the figures and the types of the MOSFETs can be exchanged in most sub circuits (e.g., changing from n-MOSFET to p-MOSFET) along with respective reference potentials. The reference potentials may be selected as desired from a range of potential values. The potential indicated as "ground" may be the lower reference potential in the circuit and not necessarily the ground level. Any of the MOSFETs may be substituted by a different type of transistor, for example, a bipolar junction transistor.

These modifications and others are intended to be encompassed by the following claims.

What is claimed is:

1. An electronic circuit for sensing a stimulus moving relative to said circuit, comprising:
   at least three sensing elements each having a photosensor responsive to the stimulus, said photosensors of said three sensing elements spatially separated with respect to one another and each configured to produce at least one electrical signal in response to the stimulus; and
   at least one motion sensor electrically connected to said three sensing elements such that said three sensing elements respectively produce a facilitation signal, a triggering signal, and an inhibition signal for said motion sensor in response to the stimulus at different times,
   wherein said motion sensor is operable to produce an output signal indicative of at least one of a direction and a speed of the stimulus based on a relationship of said facilitation signal, said triggering signal, and said inhibition signal.

2. A circuit as in claim 1, wherein said motion sensor is configured to be activated upon receiving said facilitation signal, to initiate an output signal upon receiving said triggering signal only if said triggering signal follows said facilitation signal, and to be inhibited or to terminate said output signal upon receiving said inhibition signal.

3. A circuit as in claim 1, wherein each sensing element further comprises at least one feature detector, said feature detector connected to said photosensor and configured to respond to certain features in the stimulus for producing said facilitation signal, said triggering signal, and said inhibition signal.

4. A circuit as in claim 3, wherein said feature detector includes an edge detector operating to respond to an edge in the stimulus.

5. A circuit as in claim 3, wherein said feature detector comprises:
   a current rectifier connected to receive a signal from said photosensor;
   a voltage differentiator connected to said current rectifier to produce a differentiated signal indicative of a selected feature in the stimulus at a differentiator output terminal;
   a current sensor connected to said current rectifier and configured to produce a first voltage output indicative of said selected feature; and
   a voltage inverter connected to said current sensor to produce a second voltage output according to said first voltage output.

6. A circuit as in claim 5, wherein said voltage differentiator includes a capacitor.

7. A circuit as in claim 5, wherein said current rectifier includes a p-type transistor and an n-type transistor whose gates are connected to a receiving common node to receive said signal from said photosensor and whose sources are directly connected to form a current conduit.

8. A circuit as in claim 7, further comprising a current mirror which includes first and second n-type transistors having common gates and sources, wherein the drain and gate of said first n-type transistor are both connected to the drain of said p-type transistor in said current rectifier and the drain of said second n-type transistor is connected to the drain of said n-type transistor in said current rectifier.

9. A circuit as in claim 5, wherein said current sensor includes a p-type transistor having a gate and a drain connected to each other to produce said first voltage output.

10. A circuit as in claim 5, wherein said voltage inverter comprises:
    a p-type transistor having a gate connected to receive said first output voltage from said current sensor and a source maintained at a reference voltage; and
    an n-type transistor having a drain and a gate connected to each other to the drain of said p-type transistor to produce said second voltage output and a source maintained at a different reference voltage.

11. A circuit as in claim 5, further comprising a voltage amplifier having an input terminal to receive said signal from said photosensor and configured to produce an amplified signal to said feature detector.

12. A circuit as in claim 11, wherein said voltage amplifier comprises:

a first-type transistor having a gate connected to receive a control bias reference voltage and a source maintained at a reference voltage; and a second-type transistor having a drain connected to the drain of said first-type transistor to produce said amplified signal, a gate as said input terminal to receive said signal from said photosensor, and a source maintained at a different reference voltage.

13. A circuit as in claim 11, wherein said voltage amplifier comprises two p-type transistors and two n-type transistors.

14. A circuit as in claim 11, further comprising a first feedback loop connecting said differentiator output terminal to a input reference node in said voltage amplifier to adjust a gain of said voltage amplifier.

15. A circuit as in claim 14, wherein said first feedback loop further comprises an adaptive gain stage operable to adapt a voltage at said input reference node in said voltage amplifier to a steady-state voltage.

16. A circuit as in claim 15, wherein said first feedback loop further comprises a first capacitor connected in parallel with said adaptive gain stage and a second capacitor connecting a common node of said first capacitor and said adaptive gain stage to a reference voltage.

17. A circuit as in claim 15, further comprising a second feedback loop connecting said input terminal of said voltage amplifier to said adaptive gain stage to provide an additional feedback to said input reference node.

18. A circuit as in claim 17, wherein said second feedback loop further comprises a capacitor connected between said input terminal of said voltage amplifier and said adaptive gain stage.

19. A circuit as in claim 3, wherein said feature detector includes:

a voltage amplifier connected to said photosensor at an amplifier input terminal and configured to produce an amplified signal at an amplifier output terminal; and a temporal differentiator connected to said amplifier output terminal to produce a differentiated signal indicative a selected feature in the stimulus.

20. A circuit as in claim 19, wherein said voltage amplifier comprises:

a first-type transistor having a gate connected to receive a control bias reference voltage and a source maintained at a reference voltage; and a second-type transistor having a drain connected to the drain of said first-type transistor to produce said amplified signal, a gate as said amplifier input terminal to receive said signal from said photosensor, and a source maintained at a different reference voltage.

21. A circuit as in claim 20, further comprising a feedback loop connecting said amplifier output terminal and said gate in said first-type transistor to adjust a gain at said amplifier output terminal.

22. A circuit as in claim 20, wherein said feedback loop further comprises an adaptive gain stage operable to adapt said control bias reference voltage in said voltage amplifier to a steady-state voltage.

23. A circuit as in claim 22, wherein said first feedback loop further comprises a first capacitor connected in parallel with said adaptive gain stage and a second capacitor connecting a common node of said first capacitor and said adaptive gain stage to a reference voltage.

24. A circuit as in claim 22, further comprising a second feedback loop connecting said amplifier input terminal to said adaptive gain stage to provide an additional feedback to said gate of said first-type transistor.

25. A circuit as in claim 24, wherein said second feedback loop further comprises a capacitor connected between said amplifier input terminal and said adaptive gain stage.

26. A circuit as in claim 19, wherein said temporal differentiator comprises:

a capacitor having a first terminal connected to said amplifier output terminal and a second terminal that produces a differentiated output;

a current sensor formed of a p-type transistor having a gate and a drain connected to each other to produce a first voltage output; and a voltage inverter connected to receive said first voltage output lo produce a second voltage output.

27. A circuit as in claim 26, further comprising a protection element connected between said capacitor and said current sensor, wherein said protection element includes a p-type transistor having a gate and a source connected to each other to a reference voltage, and a drain connected to said second terminal of said capacitor and the drain of said p-type transistor in said current sensor.

28. A circuit as in claim 19, wherein said temporal differentiator comprises:

a first capacitor having a first terminal connected to said amplifier output terminal and a second terminal that produces a first current;

a p-type current mirror circuit and a first n-type current mirror circuit connected to each other in series, said p-type current connected to said first capacitor to receive said first current and said first n-type current mirror circuit producing a replica of said first current at a common node;

a second capacitor having a first terminal connected to said amplifier output terminal and said first terminal of said first capacitor, said second capacitor having a second terminal that produces a second current;

a second n-type current mirror circuit having an input terminal connected to said second terminal of said second capacitor to receive said second current and an output terminal connected to produce a replica of said second current at said common node;

a current sensor formed of a p-type transistor having a gate and a drain connected to each other to said common node to sense said replicas of said first and second currents and to produce a first voltage output; and a voltage inverter connected to receive said first voltage output to produce a second voltage output.

29. A circuit as in claim 28, wherein each of said current mirror circuits includes first and second transistors of the same conduction type connected to each other at the gates and maintained at a reference voltage at the sources, said first transistor having a drain connected to the gates to receive an input current and said second transistor having a drain to reproduce said input current.

30. A circuit as in claim 28, further comprising a first protection element connected between said first capacitor and said p-type current mirror circuit, wherein said first protection element includes a p-type transistor having a gate and a source connected to each other to a reference voltage, and a drain connected to said second terminal of said first capacitor.

31. A circuit as in claim 28, further comprising a second protection element connected between said second capacitor and said second n-type current mirror circuit, wherein said second protection element includes an n-type transistor having a gate and a source connected to each other to a reference voltage, and a drain connected to said second terminal of said second capacitor and said input terminal of said second n-type current mirror circuit.

32. A circuit as in claim 1, wherein each of said photosensors comprises a light-sensing element operable to produce electrical charges by receiving radiation of the stimulus.

33. A circuit as in claim 32, wherein said light-sensing element includes a photodiode, a photogate, or a phototransistor.

34. A circuit as in claim 32, wherein each of said photosensors further comprises an amplifying circuit connected to said light-sensing element and a gain-feedback stage operable to produce a feedback signal to said light-sensing element according to an output from said amplifying circuit.

35. A circuit as in claim 1, wherein said motion sensor includes a four-terminal circuit comprising:
   a first transistor having a source at a reference voltage and a gate as a first input terminal for receiving said facilitation signal;
   a second transistor having a source at a reference voltage, a gate as a second input terminal for receiving said inhibition signal, and a drain connected to the drain of said first transistor;
   a first capacitor having one terminal at said first reference voltage and another terminal connected to said drains of said first and second transistors;
   a third transistor having a gate connected to said drains of said first and second transistors, a source at a reference voltage, and a drain as an output terminal for exporting said output signal;
   a second capacitor having one terminal maintained at a reference voltage and another terminal connected to the drain of said third transistor; and
   a fourth transistor having a gate as a third input terminal for receiving said triggering signal, a drain connected to the drain of said third transistor, and a source connected to a reference voltage.

36. A circuit as in claim 35, wherein said first and third transistors are n-type transistors and said second and fourth transistors are p-type transistors.

37. A circuit as in claim 1, wherein said sensing elements and said motion sensor are formed on a common semiconductor substrate.

38. A circuit as in claim 1, wherein said three photosensors are located adjacent to one another.

39. An electronic circuit for sensing a stimulus moving relative to said circuit, comprising:
   a plurality of sensing elements disposed relative to one another lo form an array, each sensing element having at least one photosensor responsive to the stimulus to produce at least one electrical signal; and
   a plurality of motion sensors disposed relative to said sensing elements, each connected to at least three sensing elements that are spatially displaced relative to one another to detect motion in a predetermined direction, said three sensing elements configured to respectively produce a facilitation signal, a triggering signal, and an inhibition signal in response to the stimulus,
   wherein each motion sensor is configured to be activated upon receiving said facilitation signal, to initiate an output signal upon receiving said triggering signal, and to terminate said output signal upon receiving said inhibition signal when the stimulus moves in said predetermined direction and said motion sensor is inhibited when the stimulus moves opposite to said predetermined direction.

40. A circuit as in claim 39, wherein said array formed by said sensing elements is a one-dimensional linear array.

41. A circuit as in claim 39, wherein said array formed by said sensing elements is a two-dimensional array.

42. A circuit as in claim 39, wherein said array formed by said sensing elements is a three-dimensional array.

43. A circuit as in claim 39, wherein said sensing elements and said motion sensors are configured in such a way that said electrical signal produced by said photosensor in each sensing element is used by two or more motion sensors for sensing motion in said predetermined direction.

44. A circuit as in claim 39, wherein said sensing elements and said motion sensors are configured in such a way that said electrical signal produced by said photosensor in each sensing element is used by two or more motion sensors for sensing motion in said predetermined direction and at least one another predetermined direction.

45. A circuit as in claim 39, wherein each sensing element further comprises at least one feature detector, said feature detector connected to said photosensor and configured to respond to certain features in the stimulus for producing said facilitation signal, said triggering signal, and said inhibition signal.

46. A circuit as in claim 45, wherein said feature detector comprises:
   a current rectifier connected to receive a signal from said photosensor;
   a voltage differentiator connected to said current rectifier to produce a differentiated signal indicative of a selected feature in the stimulus at a differentiator output terminal;
   a current sensor connected to said current rectifier and configured to produce a first voltage output indicative of said selected feature; and
   a voltage inverter connected to said current sensor to produce a second voltage output according to said first voltage output.

47. A circuit as in claim 45, wherein said feature detector includes:
   a voltage amplifier connected to said photosensor at an amplifier input terminal and configured to produce an amplified signal at an amplifier output terminal; and
   a temporal differentiator connected to said amplifier output: terminal to produce a differentiated signal indicative a selected feature in the stimulus.

48. A circuit as in claim 39, wherein each of said photosensors comprises a light-sensing element operable to produce electrical charges by receiving radiation of the stimulus.

49. A circuit as in claim 48, wherein said light-sensing element includes a photodiode, a photogate, or a phototransistor.

50. A circuit as in claim 39, wherein each of said motion sensors includes a four-terminal circuit comprising:
   a first transistor having a source at a reference voltage and a gate as a first input terminal for receiving said facilitation signal;
   a second transistor having a source at a reference voltage, a gate as a second input terminal for receiving said inhibition signal, and a drain connected to the drain of said first transistor;
   a first capacitor having one terminal at said first reference voltage and another terminal connected to said drains of said first and second transistors;

a third transistor having a gate connected to said drains of said first and second transistors, a source at a reference voltage, and a drain as an output terminal for exporting said output signal;

a second capacitor having one terminal maintained at a reference voltage and another terminal connected to the drain of said third transistor; and a fourth transistor having a gate as a third input terminal for receiving said triggering signal, a drain connected to the drain of said third transistor, and a source connected to a reference voltage.

51. A circuit as in claim 39, wherein said sensing elements and said motion sensor are formed on a common semiconductor substrate.

52. A circuit as in claim 39, wherein said sensing elements and said motion sensors are configured in such a way that each motion sensor receives respective signals from at least three photosensors that are located adjacent to one another.

53. A method for constructing and operating a motion sensing circuit, comprising:

placing at least three photosensors relative to one another where each is responsive to radiation indicative of an image to produce at least one electrical signal; and connecting a motion sensor to said three photosensors which respectively produce a facilitation signal, a triggering signal, and an inhibition signal for said motion sensor in response to the stimulus at different times;

configuring said motion sensor to be activated upon receiving said facilitation signal, to initiate an output signal upon receiving said triggering signal only if said triggering signal follows said facilitation signal, and to be inhibited or to terminate said output signal upon receiving said inhibition signal; and determining at least one of a direction and a speed of the image based on said output signal from said motion sensor.

54. A method as in claim 53, further comprising:

configuring a motion sensor to respond to the stimulus moving only in a predetermined direction, wherein said motion sensor is inhibited when the stimulus moves opposite to said predetermined direction.

* * * * *